United States Patent
Wang et al.

(10) Patent No.: US 9,841,568 B2
(45) Date of Patent: Dec. 12, 2017

(54) LATCH MECHANISMS FOR MODULES

(71) Applicant: FINISAR CORPORATION, Sunnyvale, CA (US)

(72) Inventors: William H. Wang, Pleasanton, CA (US); Joshua John Edward Moore, Sunnyvale, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 3 days.

(21) Appl. No.: 15/162,501

(22) Filed: May 23, 2016

(65) Prior Publication Data

US 2016/0341913 A1 Nov. 24, 2016

Related U.S. Application Data

(63) Continuation of application No. 14/296,943, filed on Jun. 5, 2014, now Pat. No. 9,348,101.

(60) Provisional application No. 61/954,294, filed on Mar. 17, 2014.

(51) Int. Cl.
  *G02B 6/38* (2006.01)
  *G02B 6/42* (2006.01)
  *H01R 13/633* (2006.01)
  *H01R 13/627* (2006.01)

(52) U.S. Cl.
  CPC ......... *G02B 6/3893* (2013.01); *G02B 6/4246* (2013.01); *G02B 6/4261* (2013.01); *G02B 6/4292* (2013.01); *H01R 13/627* (2013.01); *H01R 13/6335* (2013.01)

(58) Field of Classification Search
  None
  See application file for complete search history.

(56) References Cited

U.S. PATENT DOCUMENTS

2003/0198029 A1* 10/2003 Zaremba ............. G02B 6/4277
  361/752
2005/0018979 A1* 1/2005 Mizue ................. G02B 6/4292
  385/92

* cited by examiner

*Primary Examiner* — Jerry Rahll
(74) *Attorney, Agent, or Firm* — Maschoff Brennan

(57) ABSTRACT

Latch mechanisms for modules are disclosed. A module includes a housing and a release slide. The housing includes a first rib located on a first side of the housing and a second rib located on a second side of the housing. The release slide is slidingly positioned on the housing. The release slide includes a release slide base, a first release slide arm extending from the release slide base, and a second release slide arm extending from the release slide base. A first flange extending from the first release slide arm is positioned at least partially over the first rib. A second flange extending from the second release slide arm is positioned at least partially over the second rib.

20 Claims, 22 Drawing Sheets

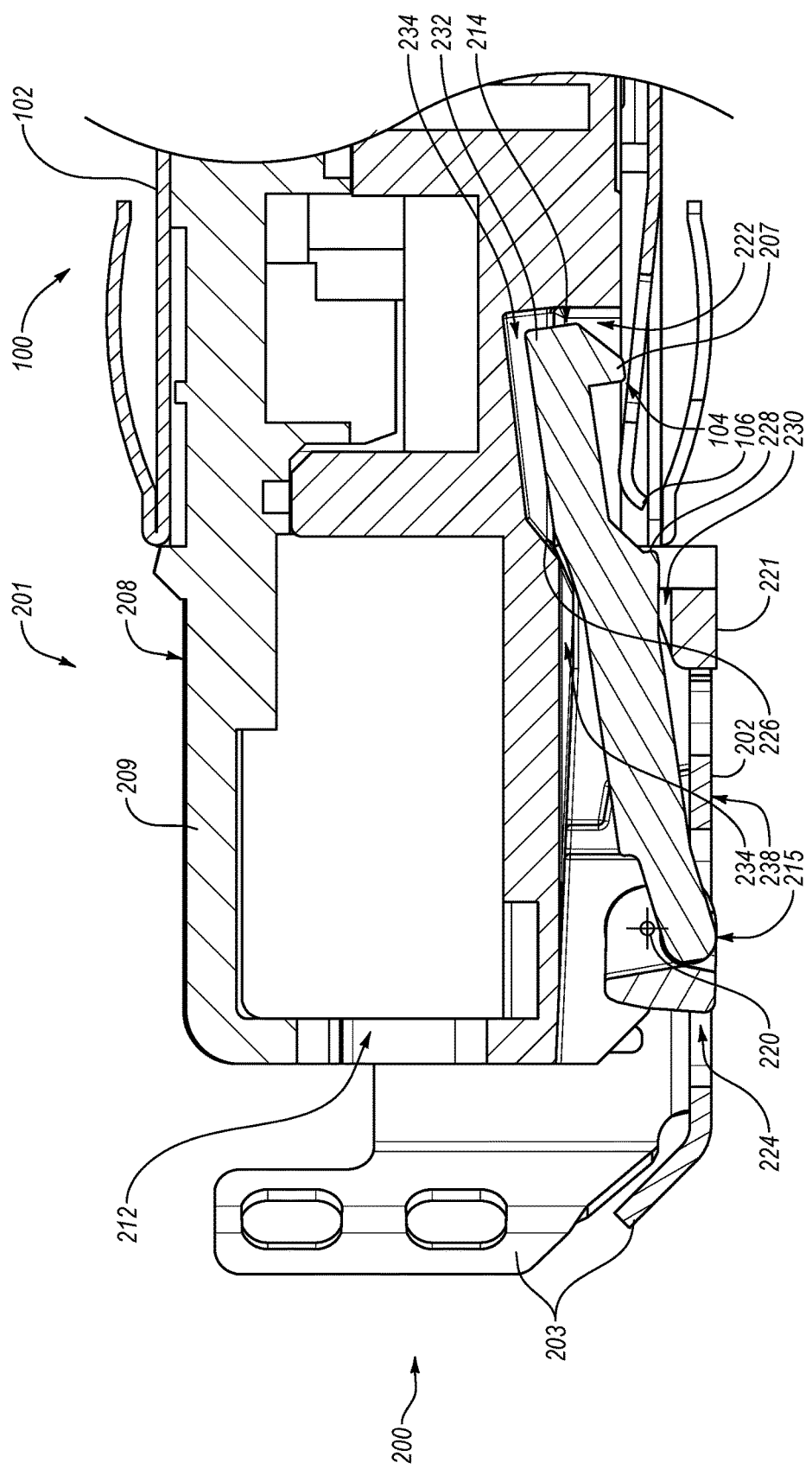

LATCH MECHANISMS FOR MODULES

CROSS-REFERENCE TO RELATED APPLICATIONS

This application is a continuation of U.S. application Ser. No. 14/296,943, filed Jun. 5, 2014, which claims priority to U.S. Provisional Application No. 61/954,294, filed Mar. 17, 2014, titled LATCH MECHANISM FOR MODULES, both which are incorporated herein by reference in their entirety.

FIELD

The embodiments discussed herein relate generally to communication modules. More particularly, example embodiments relate to latch mechanisms for selectively engaging communication modules with a housing of a host device.

BACKGROUND

Electronic modules, such as transceiver or transponder modules configured to transmit and receive electrical or optical data signals, are used in electronic and optoelectronic communication. Some modules are pluggable, which permits the module to be inserted into and removed from a receptacle of a host device, such as a host computer, switching hub, network router, or switch box. Some host devices include multiple receptacles and can therefore accommodate multiple modules simultaneously. Each module typically communicates with a printed circuit board of the host device by transmitting and/or receiving electrical signals to and/or from the host device printed circuit board. These electrical signals can also be transmitted by or to the module outside the host device as optical and/or electrical signals.

The subject matter claimed herein is not limited to embodiments that solve any disadvantages or that operate only in environments such as those described above. Rather, this background is only provided to illustrate one example technology area where some embodiments described herein may be practiced.

SUMMARY

The embodiments discussed herein relate generally to communication modules. More particularly, example embodiments relate to latch mechanisms for selectively engaging communication modules with a housing of a host device.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example, a module includes a housing and a release slide slidingly positioned at least partially on the housing. The housing includes a first rib located on a first side of the housing and a second rib located on a second side of the housing positioned opposite the first side of the housing. The release slide includes a release slide base, a first release slide arm extending from the release slide base, and a second release slide arm extending from the release slide base. The first release slide arm is at least partially positioned on the first side of the housing and the second release slide arm is at least partially positioned on the second side of the housing. A first flange extends from the first release slide arm and is positioned at least partially over the first rib. A second flange extends from the second release slide arm and is positioned at least partially over the second rib.

In another example, a module includes a housing, a release slide slidingly positioned at least partially on the housing, and a handle coupled to a coupling structure of the release slide. The housing includes a depression formed in the housing relative to outer surfaces of the housing, a face adjacent to the depression, channels formed in the housing, a first rib, and a second rib. The first rib is located entirely within the depression on a first side of the housing. The second rib is located entirely within the depression on a second side of the housing positioned opposite the first side of the housing. The release slide includes a release slide base, fingers extending from the release slide base, a first release slide arm extending from the release slide base, and a second release slide arm extending from the release slide base. The fingers are positioned at least partially within the channels formed in the housing. The first release slide arm is at least partially positioned on the first side of the housing and the second release slide arm is at least partially positioned on the second side of the housing. A first flange extends from the first release slide arm and is positioned at least partially over the first rib. A second flange extends from the second release slide arm and is positioned at least partially over the second rib. The release slide is selectively slidable between a latched position and an unlatched position. The face of the housing is positioned to arrest sliding movement of the release slide in a first direction by way of contact with the release slide. The channels formed in the housing are positioned to arrest sliding movement of the release slide in a second direction by way of contact with the fingers of the release slide.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3D is a cutaway side view of the portion of the host device of FIG. 3A with the optoelectronic module in the unlatched configuration;

DESCRIPTION OF EMBODIMENTS

Figure 1A:
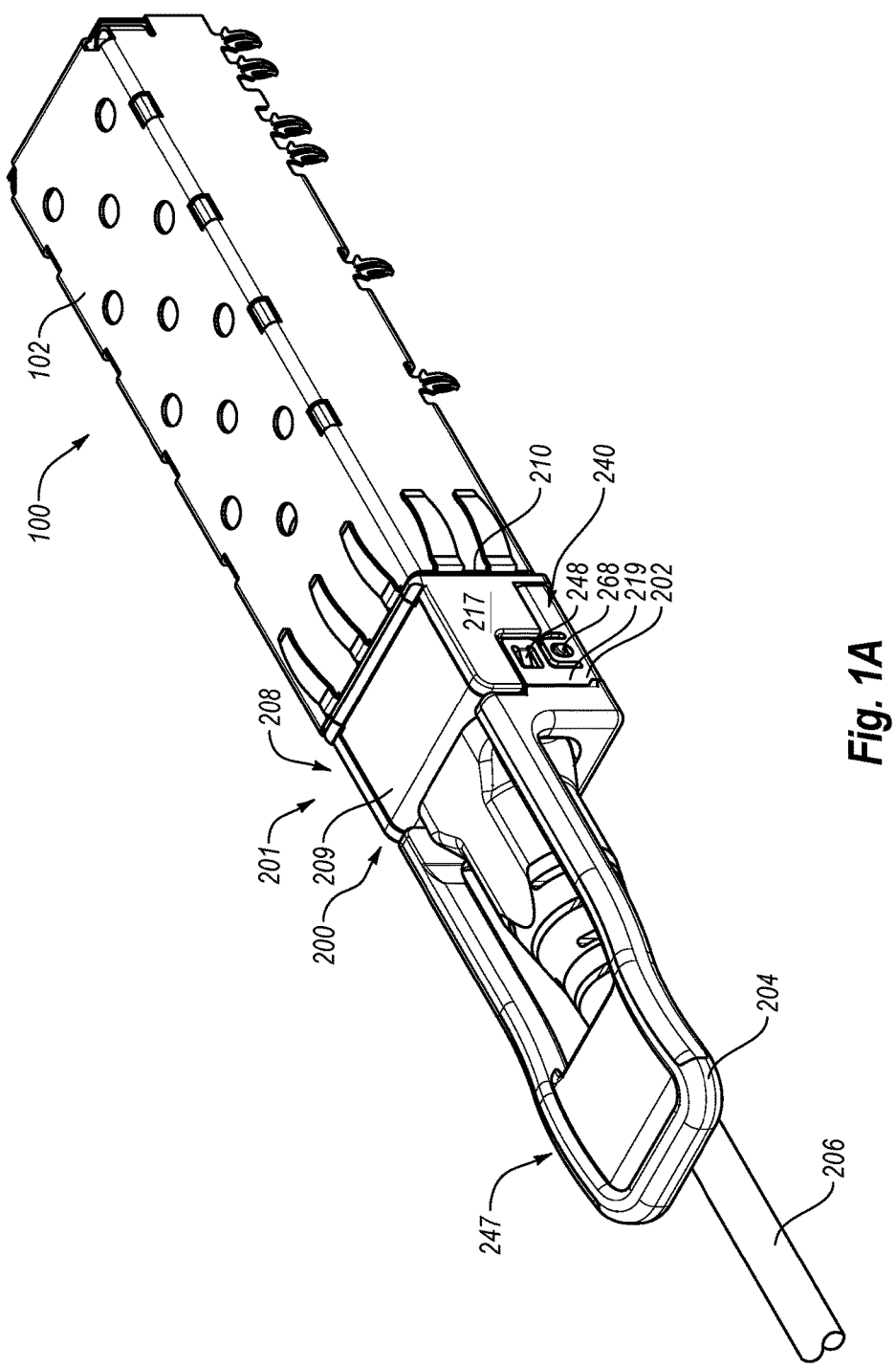
FIG. 1A is a top perspective view of portions of an example host device with an example optoelectronic module in a latched configuration located partially inside the example host device.

Example embodiments relate to latch mechanisms for selectively engaging communication modules with host devices. Example embodiments also relate to modules such as communication modules that include latch mechanisms for selectively engaging the communication modules with host devices.

Embodiments described herein may include fewer and/or less complex parts, and may allow for simplified assembly compared to traditional latch mechanisms. Furthermore, components of the latch mechanism may be manufactured via less complex, less expensive, and/or less time-consuming manufacturing processes relative to traditional latch mechanisms. For at least these reasons, some embodiments may be less expensive and/or less expensive to implement relative to traditional latch mechanisms.

Embodiments described herein may alternatively or additionally reduce, and potentially may eliminate, undesired motions of a latch mechanism relative to a housing of the module. For example, embodiments described herein may reduce undesired looseness in the latch mechanism compared to traditional latch mechanisms. Embodiments may exhibit reduced rocking and/or rolling motions of the latch mechanism compared to traditional latch mechanisms.

In some embodiments, the latch mechanism may include a release slide with an interfacing portion having a low profile relative to a housing of a module. The low height of the interfacing portion of the release slide relative to the housing may reduce the mechanical looseness between the release slide and the housing.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale. Many of the features of the disclosed embodiments may be substantially symmetrical and/or may be arranged symmetrically and a pluralized reference to a feature may refer to a pair of similar features of which only one may be labeled in the drawings.

1. Example Host Device and Communications Module

Figure 1B:
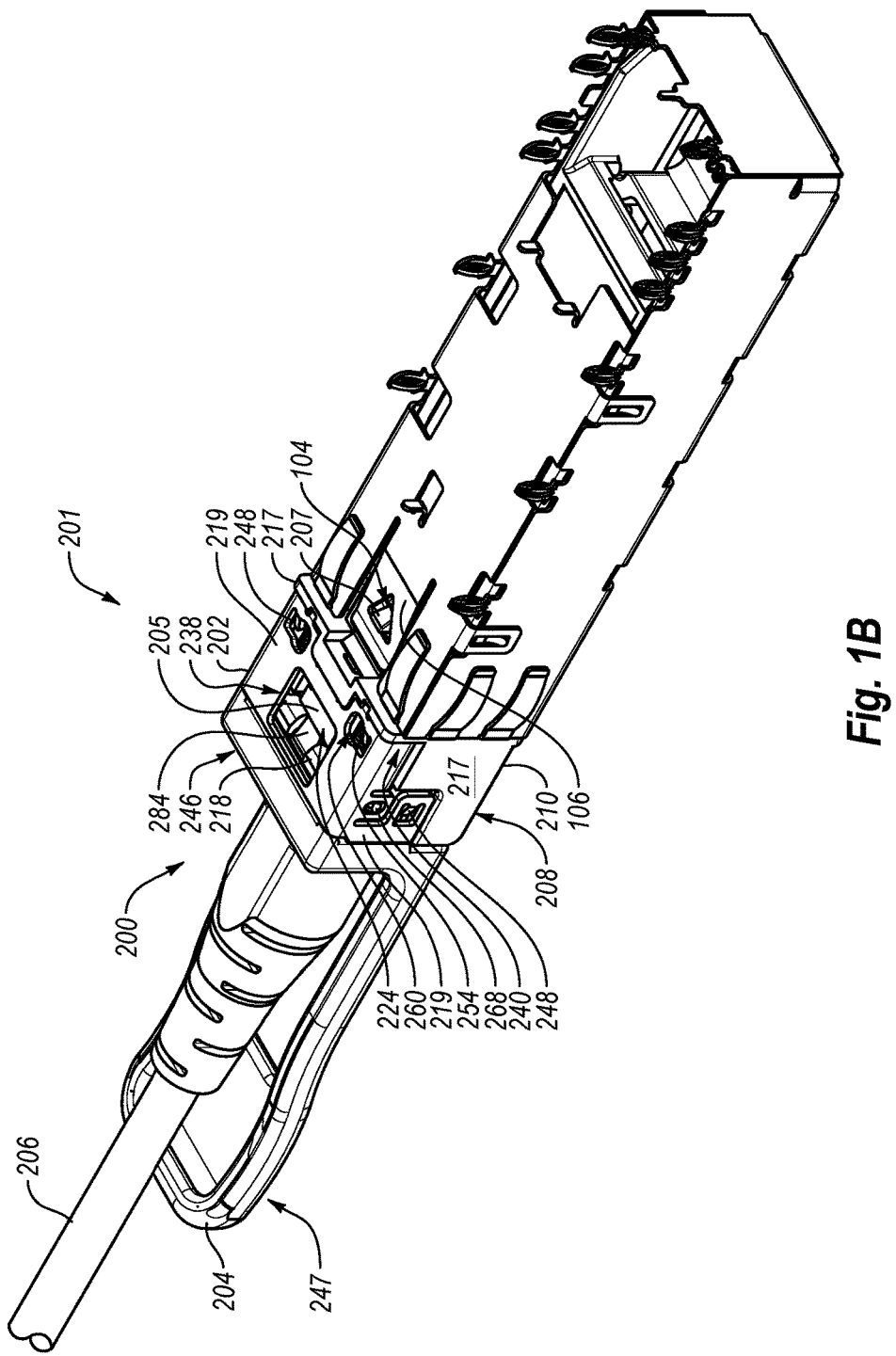
FIG. 1B is a bottom perspective view of the portions of the host device of FIG. 1A with the optoelectronic module in the latched configuration.

FIGS. 1A and 1B are, respectively, top and bottom perspective views of a portion of an example host device 100 with an example optoelectronic module 200 in a latched configuration located at least partially inside the host device 100. The optoelectronic module 200 includes a handle 204 and is coupled to a fiber optic cable 206.

Figure 2A:
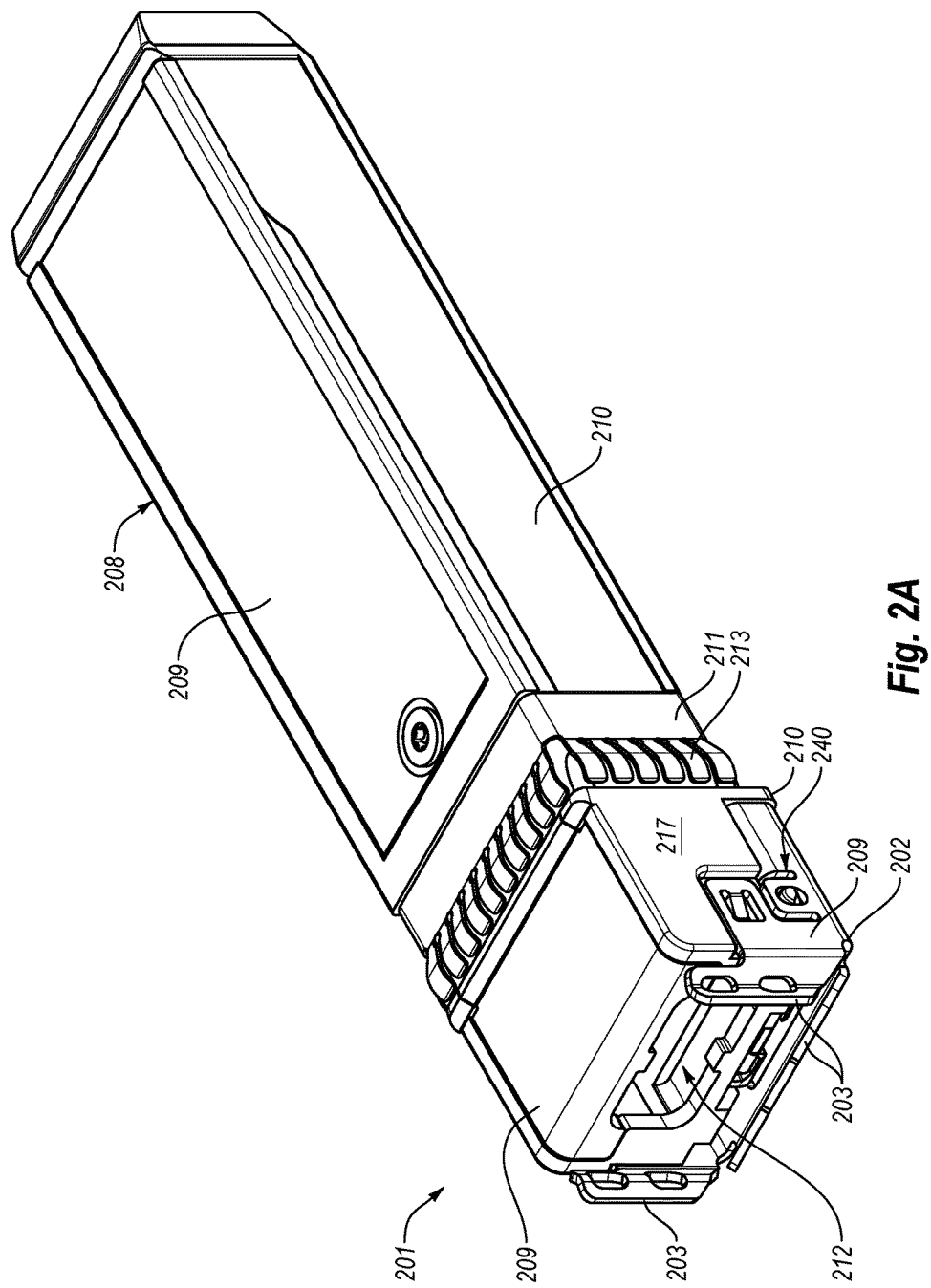
FIG. 2A is top perspective view of portions of the optoelectronic module of FIG. 1A in the latched configuration and with portions of the optoelectronic module omitted.
Figure 2B:
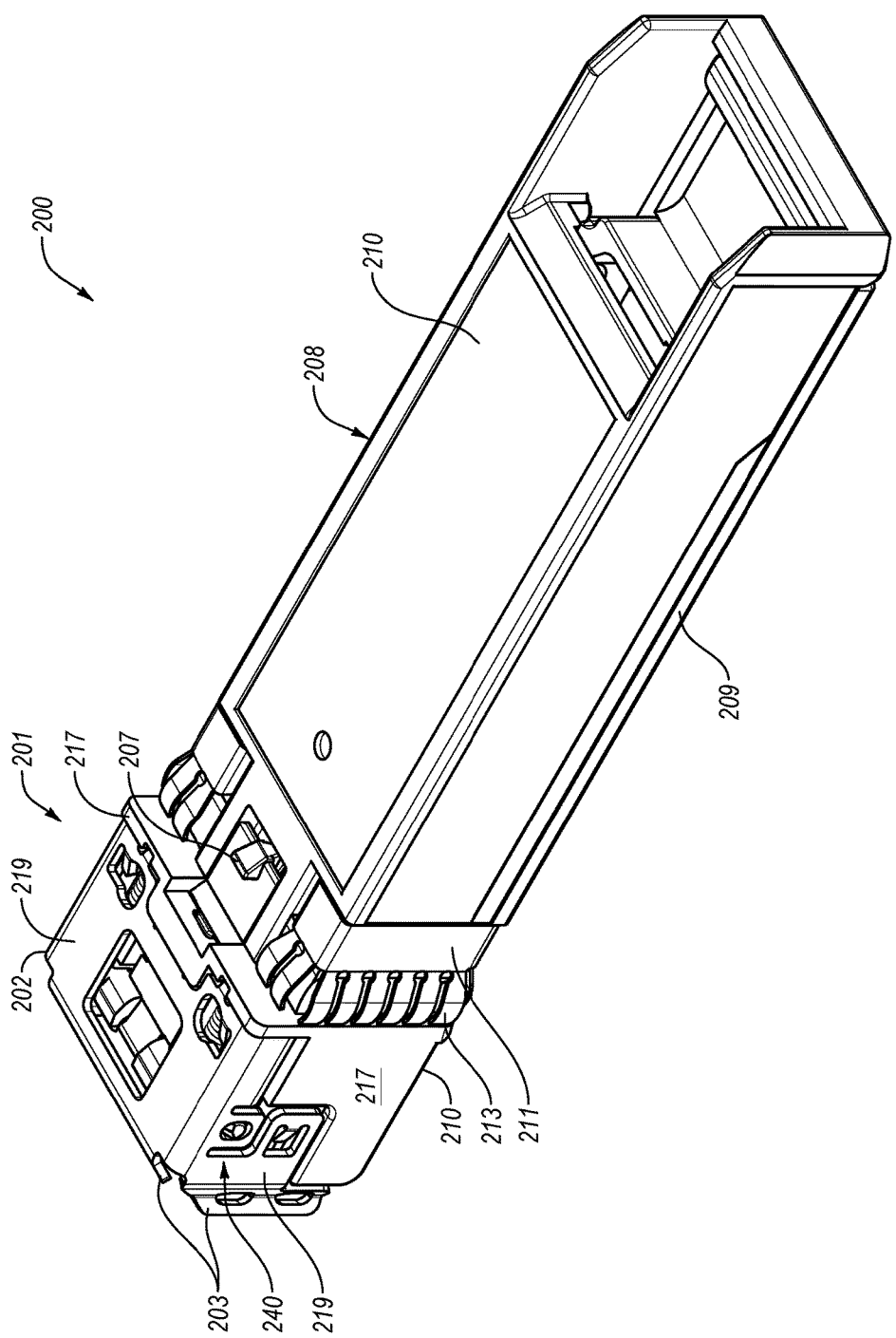
FIG. 2B is a bottom perspective view of the optoelectronic module of FIG. 2A in the latched configuration.

FIGS. 2A and 2B are, respectively, top and bottom perspective views of the optoelectronic module 200 in the latched position and with one or more portions of the optoelectronic module 200 omitted. For example, in FIGS. 2A and 2B, the handle 204 and the fiber optic cable 206 are omitted.

With combined reference to FIGS. 1A-2B, the optoelectronic module 200 may be employed in the communication of optical signals and the conversion of optical signals to and from electrical signals. In connection, the host device 100 may be employed in the communication of corresponding electrical signals.

The optoelectronic module 200 may include a transmit port and/or a receive port (not shown) located within a port opening 212 (shown, e.g., in FIG. 2A) at a front end section 201 of the optoelectronic module 200. The transmit port and/or the receive port may be in optical communication with fibers of the fiber optic cable 206. The optoelectronic module 200 may be configured for optical signal transmission and reception via the fiber optic cable 206 at a variety of data rates including, but not limited to, 1.25 Gb/s, 2.125 Gb/s, 2.5 Gb/s, 4.25 Gb/s, 8.5 Gb/s, 10.3 Gb/s, 10.5 Gb/s, 11.3 Gb/s, 14.025 Gb/s, or 100 Gb/s or higher.

The optoelectronic module 200 may be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. The optoelectronic module 200 may be configured to support various communication protocols including, but not limited to, Optical Fast Ethernet, Optical Gigabit Ethernet, 10 Gigabit Ethernet, and 1×, 2×, 4×, 8×, and 16× Fibre Channel.

Although one example of the optoelectronic module 200 is configured to have a form factor that is substantially compliant with an enhanced small form-factor pluggable (SFP+) multi-source agreement (MSA), the optoelectronic module 200 may alternatively be configured in a variety of different form factors that are substantially compliant with other MSAs including, but not limited to, a small form-factor pluggable (SFP) MSA. Finally, although the optoelectronic module 200 is illustrated as a pluggable optoelectronic transceiver module, example embodiments of the latching mechanism disclosed herein may alternatively be employed, for example, in connection with pluggable electronic transceiver modules, other pluggable electronic devices such as pluggable media drives, or the like.

The host device 100 may include a cage 102 (shown, e.g., in FIG. 1A and FIG. 1B) configured to be connected to a host printed circuit board (not shown). The cage 102 at least partially receives the optoelectronic module 200 when the optoelectronic module 200 is inserted into the cage 102 and is mechanically and electrically connected to the host device 100. The cage 102 includes a cage recess 104. The cage recess 104 may allow the optoelectronic module 200 to selectively engage the cage 102 such that the optoelectronic module 200 is prevented from moving significantly within the cage 102 until the optoelectronic module 200 is intentionally disengaged from the cage 102. As a result, the mechanical and electrical connection between the optoelectronic module 200 and the host device may be maintained and unintentional disconnection may be reduced and potentially eliminated.

2. First Example Latching Mechanism

The optoelectronic module 200 includes an example latching mechanism. The latching mechanism is configured for use in selectively securing and releasing the optoelectronic module 200 within a receptacle, such as the cage 102.

The optoelectronic module 200 may include a release slide 202. Optionally, the optoelectronic module 200 may include the handle 204 coupled to the release slide 202. The release slide 202 may be formed in various ways, including, but not limited to, being stamped from sheet metal or molded from hard plastic.

The handle 204 may be formed from a polycarbonate material, though other suitable materials may alternately or additionally be used. The handle 204 may be rigid enough to generally maintain its shape, but capable of being flexed by a user, for example, during extraction of the optoelectronic module 200 from the cage 102.

The handle 204 may include a first end section 246 and a second end section 247. The first end section 246 may be coupled to a coupling structure 203 of the release slide 202. For example, the first end section 246 of the handle 204 may be over-molded around the coupling structure 203.

The handle 204 is configured to be manually pulled and pushed in order to slide the release slide 202 between its latched position and its unlatched position relative to a housing 208. Alternately or additionally, the release slide 202 may be directly pulled and pushed between the latched position and the unlatched position. The release slide 202 may optionally be shaped to assist a user in gripping the release slide 202 directly.

The housing 208 may include a top housing 209 and a bottom housing 210 (shown, e.g., in FIGS. 2A and 2B) coupled together. The top housing 209 may be removed from the bottom housing 210, e.g., to access an interior of the optoelectronic module 200. The housing 208 may at least partially surround receiver and/or transmitter circuitry (not shown), including a printed circuit board having an edge connector (not shown) configured to be electrically coupled to the host device. The bottom housing 210 and/or the top housing 209 may be die cast in zinc. Alternately or additionally, the bottom housing 210 and/or the top housing 209 may be die cast, or otherwise manufactured, from other suitable materials or a combination of other suitable materials.

The optoelectronic module 200 may include a conductive electromagnetic interference (EMI) shield 211 (shown, e.g., in FIGS. 2A and 2B) located at least partially around the housing 208. The EMI shield 211 may reduce the degree of electromagnetic interference created and/or experienced by the optoelectronic module 200. The EMI shield 211 may include conductive fingers 213. The conductive fingers 213 may form an electrically conductive connection with the cage 102.

The optoelectronic module 200 includes an engagement pin 207 (shown, e.g., in FIGS. 1B and 2B). The engagement pin 207 is configured to engage the cage recess 104 when the optoelectronic module 200 is in the latched configuration. By engaging the cage recess 104, the engagement pin 207 may generally prevent the optoelectronic module 200 from moving significantly within the cage 102 until the engagement pin 207 and the cage recess 104 are intentionally disengaged from each other. The engagement pin 207 and the cage recess 104 may be disengaged from each other when the optoelectronic module 200 is in the unlatched configuration.

As used herein, the term "latched configuration" refers to the configuration of the optoelectronic module 200 that results in the engagement pin 207 being engageable with the cage 102. The components of the optoelectronic module 200 are referred to herein as being in a "latched position" when the optoelectronic module 200 is in the latched configuration. Conversely, as used herein, the term "unlatched configuration" refers to the configuration of the optoelectronic module 200 that results in the engagement pin 207 not being engageable with the cage 102. The components of the optoelectronic module 200 are referred to herein as being in an "unlatched position" when the optoelectronic module 200 is in the unlatched configuration.

In addition, the optoelectronic module 200 may include a front, a rear, a top, a bottom, and two opposing sides. The front of the optoelectronic module 200 may generally refer to an end of the optoelectronic module 200 within which the port opening is defined. The rear of the optoelectronic module 200 may generally refer to an end of the optoelectronic module 200 opposite the front. The bottom of the optoelectronic module 200 may generally refer to a surface of the optoelectronic module 200 from which the engagement pin 207 extends when in its latched position. The top of the optoelectronic module 200 may generally refer to a surface of the optoelectronic module 200 that is opposite the bottom. The two opposing sides of the optoelectronic module may generally refer to surfaces of the optoelectronic module 200 that connect the top to the bottom.

Use of the terms front, rear, top, and bottom, and/or up, down, forward, backward, and other directional terms as applied to the optoelectronic module 200, any of its components, and/or other embodiments illustrated in FIGS. 4A-7F may be interpreted in view of the foregoing convention. For example, the first end section 246 of the handle 204 may alternately be referred to as a rear end section of the handle 204, while the second end section 247 of the handle may alternately be referred to as a front end section of the handle 204. Alternately or additionally, the second end section 247 of the handle 204 may be described as being located forward of the first end section 246, and/or the first end section 246 may be described as being located rearward of the second end section 247.

Figure 3A:
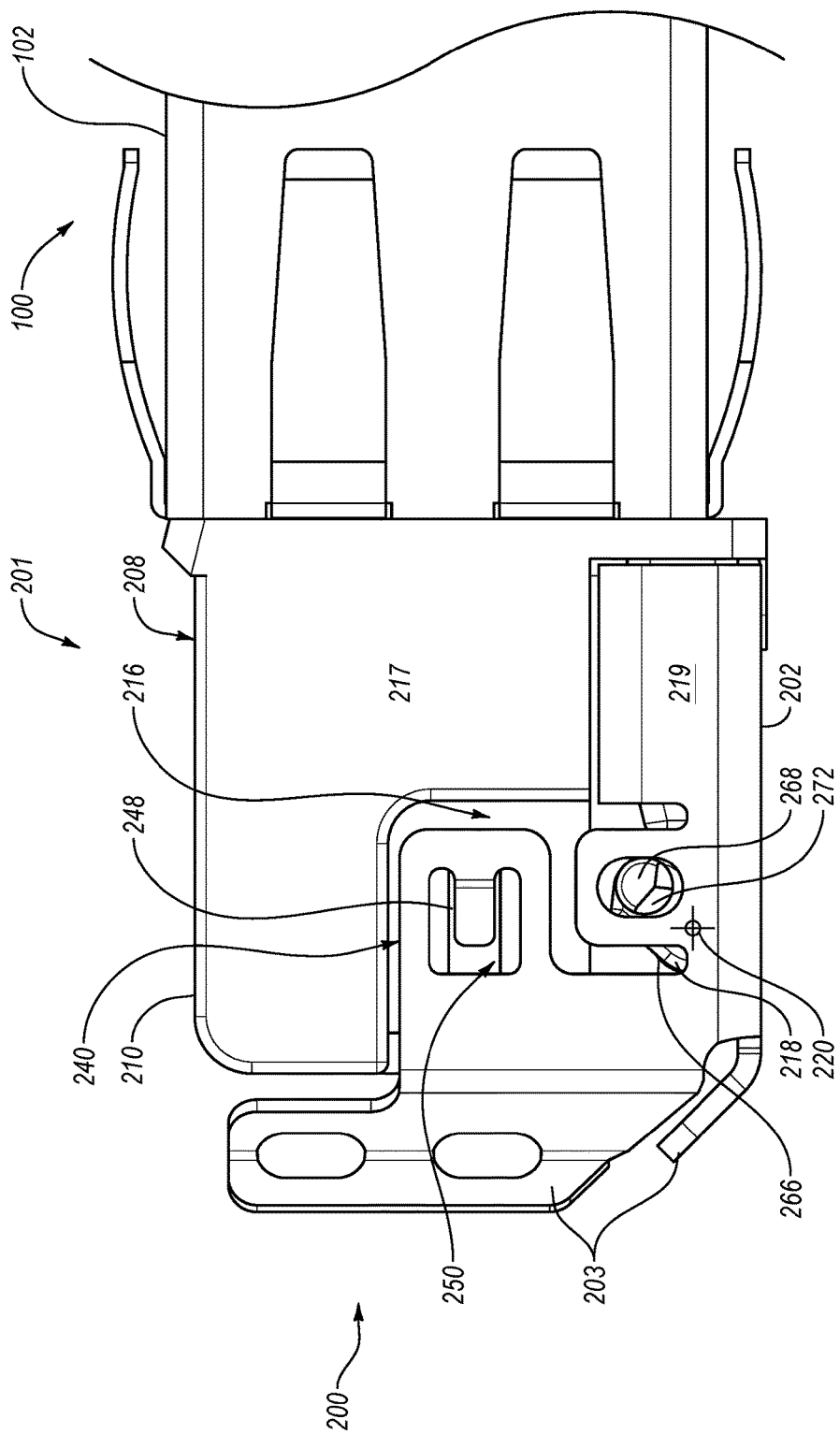
FIG. 3A is a side view of a portion of the host device of FIG. 1A with the optoelectronic module in the latched configuration and with portions of the optoelectronic module omitted.
Figure 3B:
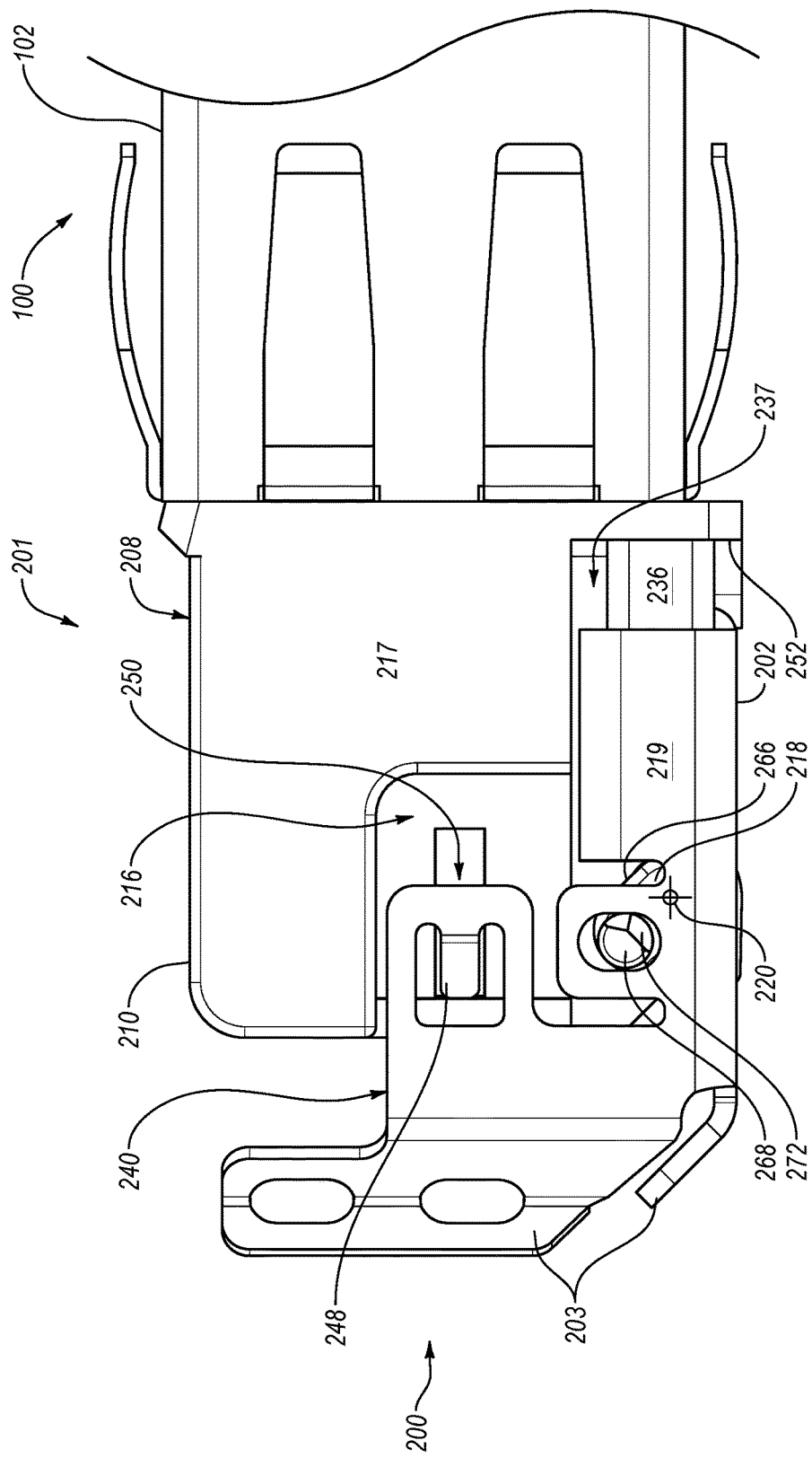
FIG. 3B is a side view of the portion of the host device of FIG. 3A with the optoelectronic module in an unlatched configuration.

FIG. 3A is a side view of the host device 100 with the optoelectronic module 200 in the latched configuration and with the fiber optic cable 206, the handle 204, and portions of the housing 208 omitted. FIG. 3B is a side view of the host device 100 of FIG. 3A with the optoelectronic module 200 in the unlatched configuration.

Figure 3C:
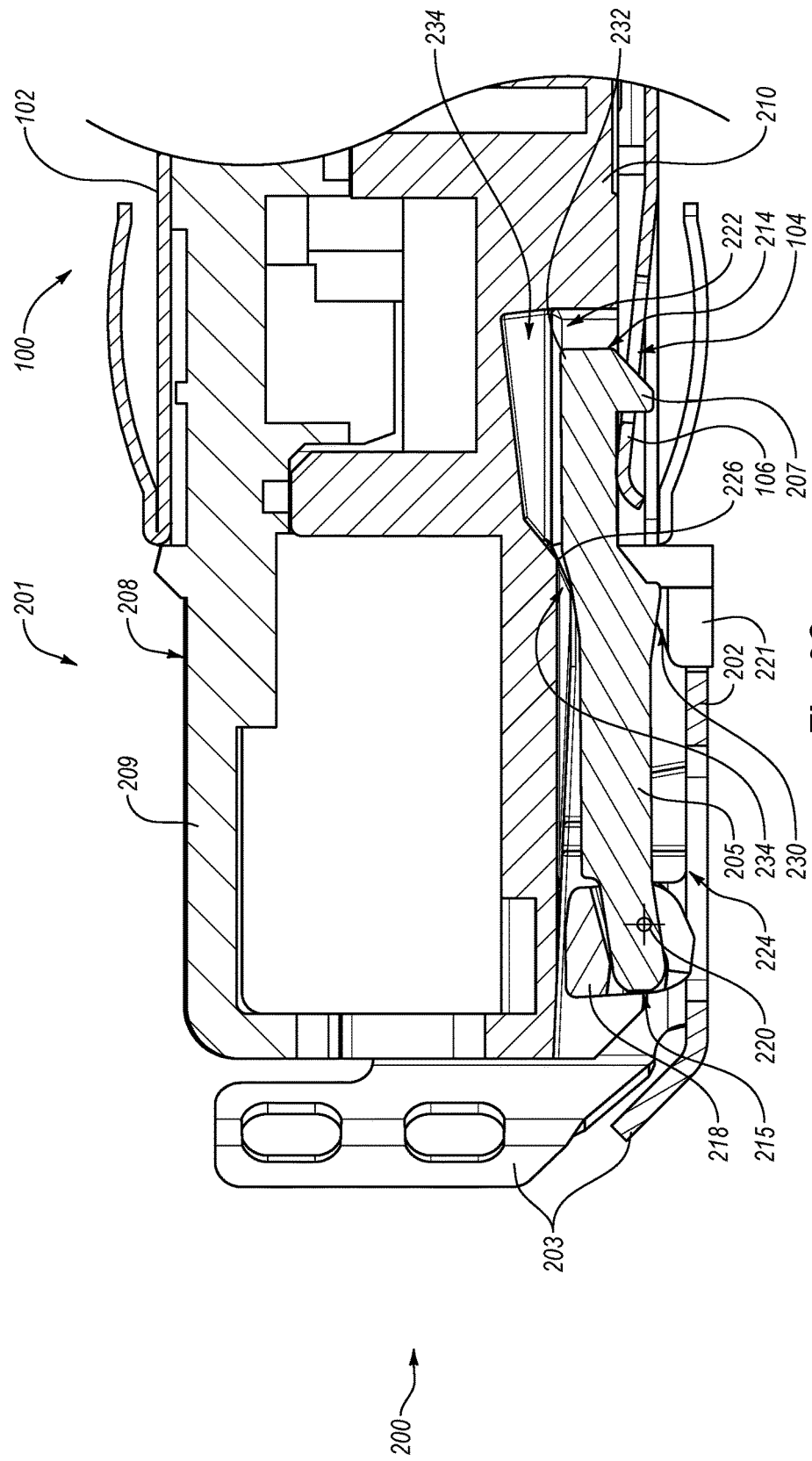
FIG. 3C is a cutaway side view of the portion of the host device of FIG. 3A with the optoelectronic module in the latched configuration.

FIG. 3C is a cutaway view of the host device 100 with the optoelectronic module 200 in the latched configuration. FIG. 3D is a cutaway view of the host device 100 with the optoelectronic module 200 in the unlatched configuration.

Figure 3E:
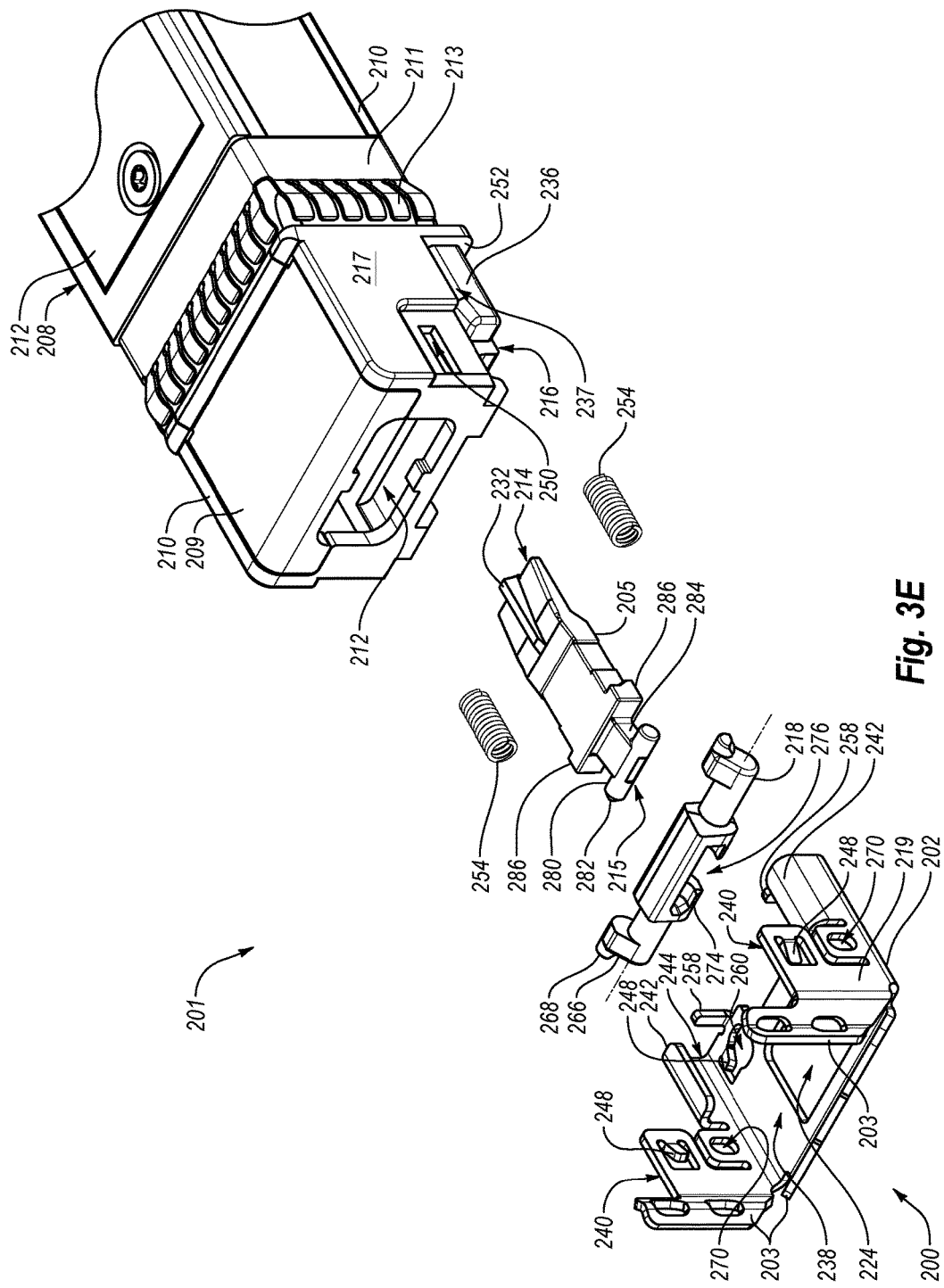
FIG. 3E is an exploded top perspective view of a portion of a front end section of the optoelectronic module of FIG. 3A.
Figure 3F:
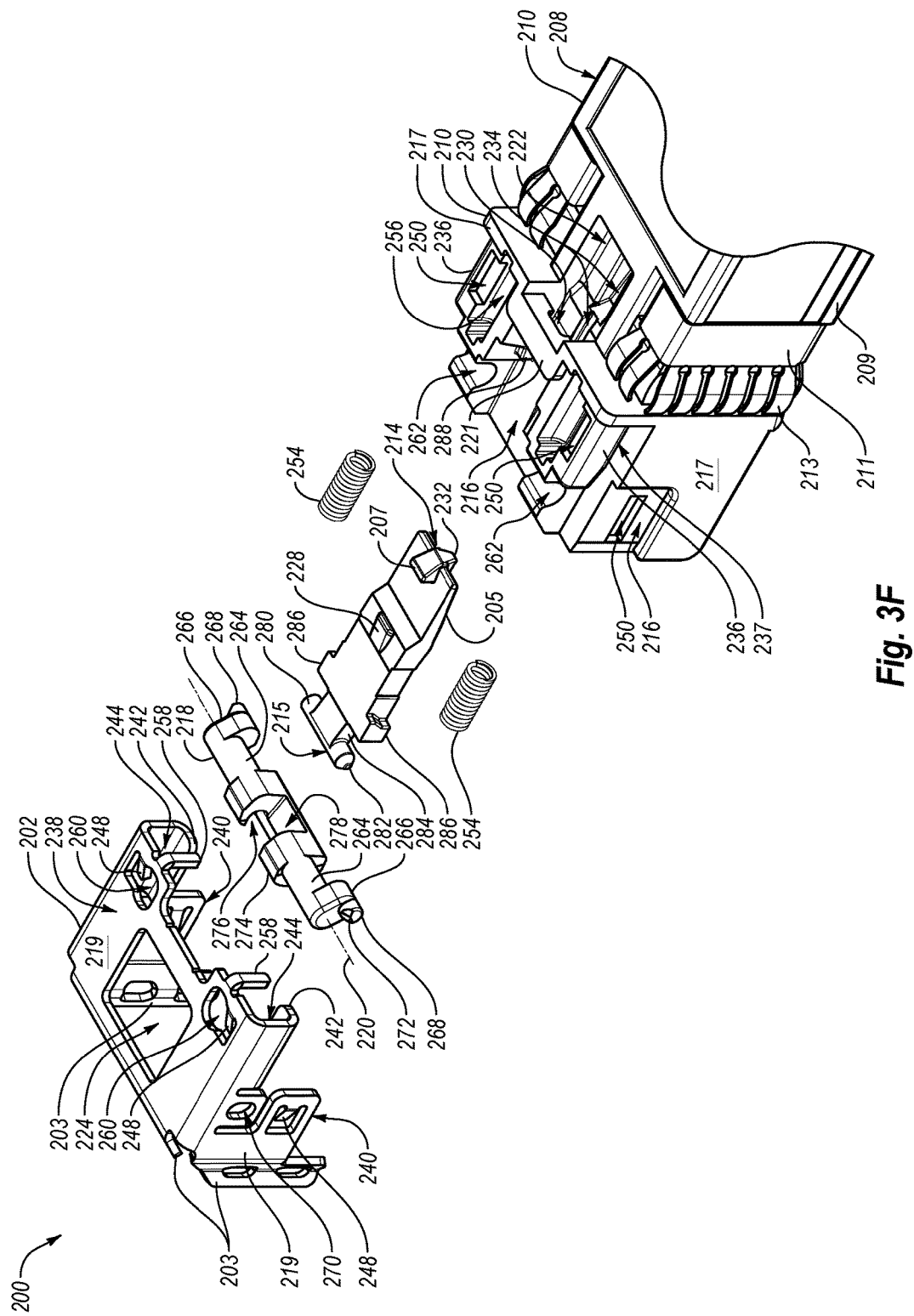
FIG. 3F is an exploded bottom perspective view of a portion of the front end section of the optoelectronic module of FIG. 3A.

FIGS. 3E and 3F are, respectively, top and bottom exploded perspective views of a portion of the front end section 201 of the optoelectronic module 200.

With combined reference to FIGS. 3A-3F, in some embodiments, the housing 208 may include a pair of ribs 236 (FIGS. 3B, 3E, and 3F) located on opposite sides of the housing 208. For example, the bottom housing 210 may include a first of the ribs 236 formed on a first side of the bottom housing 210 and a second of the ribs 236 formed on a second side of the bottom housing 210 opposite the first side. In some embodiments, the ribs 236 may include elongate protrusions. Alternately or additionally, the ribs 236 and/or the housing 208 may be sized and shaped to form guides 237 (FIGS. 3B, 3E, and 3F).

In some embodiments, the ribs 236 may be located in a depression 216 (FIGS. 3A, 3B, 3E, and 3F) relative to outer surfaces 217 (FIGS. 3A, 3B, 3E, and 3F) of the housing 208. Alternately or additionally, the ribs 236 may not extend beyond the outer surfaces 217 of the housing 208, e.g., the ribs 236 may be located entirely within the depression 216 relative to the outer surfaces 217. Alternately, the ribs 236 may extend beyond the outer surfaces 217.

The release slide 202 may include a release slide base 238 (FIGS. 3D-3F) and a pair of release slide arms 240 (FIGS. 3A, 3B, 3E, and 3F) extending from the release slide base 238. The release slide arms 240 may extend upward from the release slide base 238 parallel or substantially parallel to each other. In some embodiments, the release slide 202 includes flanges 242 (FIGS. 3E and 3F). The flanges 242 may be located on the release slide arms 240. Alternately or additionally, the flanges 242 may extend from the release slide arms 240 inwardly towards each other.

In some embodiments, the flanges 242 may be substantially coplanar. In some embodiments, the flanges 242 may include elongate shelf structures. Alternately, each of the flanges 242 may include one or more fingers (not shown) or the like.

The flanges 242 and the release slide arms 240 may be sized and shaped to form tracks 244 (FIGS. 3E and 3F) sized and shaped to fit on and/or accommodate the ribs 236. Each of the flanges 242 may be positioned at least partially over a corresponding one of the ribs 236. The release slide base 238 may be positioned at least partially under the ribs 236. In some embodiments, the flanges 242 may fit at least partially within the guides 237.

The ribs 236, the release slide arms 240, and the flanges 242 are sized and shaped to allow the release slide 202 to slide relative to the housing 208. In some embodiments, the ribs 236 may be sized and positioned such that the portion of the release slide arms 240 that fits over the ribs 236 may have a low profile relative to a height of the housing 208 where the ribs 236 are located. In some embodiments, the low profile of the portion of the release slide arms 240 that fits over the ribs 236 and the configuration of the ribs 236 may reduce sensations of looseness of the release slide 202 relative to the housing 208.

In some embodiments, the flanges 242, the release slide arms 240, and/or the release slide base 238 may form a close fit with the ribs 236 and/or the housing 208 such that the release slide 202 resists rocking and rolling motions relative to the housing 208.

In some embodiments, the ribs 236 are positioned at least partially to one side of the port opening 212. For example, the ribs 236 may be located at least partially below the port opening 212. In some embodiments, the ribs 236 may be located entirely to one side of the port opening 212. For example, as best seen in FIG. 3E, the ribs 236 may be located entirely below the port opening 212.

With combined reference to FIG. 1A and FIG. 1B, the second end section 247 of the handle 204 may be positioned at least partially to a different side of the port opening 212. Thus, the second end section 247 may be located on a side of the port opening 212 and the fiber optic cable 206 (when present) different from the side of the optoelectronic module 200 including the engagement pin 207. For example, the engagement pin 207 may be located at the bottom of the optoelectronic module 200 and the second end section 247 of the handle 204 may be located at the top of the optoelectronic module 200.

With combined reference to FIGS. 3A-3F, the release slide 202 may fit at least partially within the depression 216. In some embodiments, the depression 216 may be sized and shaped such that outer surfaces 219 (FIGS. 3A, 3B, 3E, and 3F) of the release slide 202 and the outer surfaces 217 of the housing 208 are substantially aligned or flush with each other.

In some embodiments, the release slide 202 may include fingers 248 (FIGS. 3A, 3B, 3E, and 3F) sized and shaped to be received in corresponding channels 250 (FIGS. 3A, 3B, 3E, and 3F) formed in the housing 208. One or more of the fingers 248 may extend inward from the outer surfaces 219 and/or may extend upward from the release slide base 238. Alternately or additionally, the corresponding channels 250 may be formed in corresponding locations of the housing 208. The fingers 248 and the channels 250 may form a pull stop and/or a push stop for the release slide 202 such that the sliding movement of the release slide 202 is arrested by the fingers 248 contacting the ends of the channels 250 when the release slide 202 reaches a latched position and/or an unlatched position.

Alternately or additionally, the housing 208 may include a face 252 (FIGS. 3B and 3E) configured to form a push stop for the release slide 202 such that the sliding movement of the release slide 202 is arrested by the release slide 202 contacting the face 252 of the housing 208. The face 252 may be positioned adjacent to the depression 216.

Alternately or additionally, the fingers 248 and the channels 250 may reduce sensations of looseness of the release slide 202 relative to the housing 208. For example, up and/or down movement, latitudinal movement, and/or rotational movement such as tipping, rocking, and/or rolling of the release slide 202 relative to the housing 208 may be arrested by the fingers 248 contacting sides and/or beds of the channels 250.

Optionally, the optoelectronic module 200 may include one or more resilient members 254 (FIGS. 3E and 3F) configured to urge the release slide 202 to its latched position. In some embodiments the resilient members 254 may include coil compression springs. However, other types of resilient members may alternatively or additionally be used. For example, the resilient members 254 may include one or more tension springs, torsion springs, leaf springs, cantilever springs, other compression springs, or the like or any combination thereof. In some embodiments, the resilient members 254 may be formed as an integrated portion of the release slide 202.

In some embodiments, the resilient members 254 may be located at least partially within recesses 256 (FIG. 3F) formed in the housing 208. Alternately or additionally, each resilient member 254 may be located in the corresponding recess 256 with a front end of the resilient member 254 at or near a front wall of the corresponding recess 256 and a rear end of the resilient member 254 at or near a front surface of a finger 258 (FIGS. 3E and 3F) that extends upward from the release slide base 238. Thus, forward motion of the release slide base 238 relative to the housing when the release slide base 238 is moved from the latched position towards the unlatched position may cause the fingers 258 to compress the resilient members 254 within the recesses 256 against the front walls of the recesses 256. When thus compressed, the compressed resilient members 254 may urge the release slide base 238 from its unlatched position towards its latched position.

Stated another way, the resilient members 254 contact the housing 208 and the release slide 202 such that the resilient members 254 are resiliently deformed when the release slide 202 is moved from its latched position. For example, the front ends of the resilient members 254 may contact the front walls of the recesses 256 and the rear ends of the resilient members 254 may contact the fingers 258 of the release slide 202 such that the resilient members 254 are resiliently compressed between the housing 208 and the release slide 202 as the release slide 202 is moved from the latched position towards the unlatched position. The resilient members 254 may alternately or additionally contact a cam 218 such that the resilient members 254 are resiliently deformed when the cam 218 is moved from its latched position towards its unlatched position.

In some embodiments, the release slide 202 may include openings 260 sized to receive the resilient members 254 such that the resilient members 254 may be assembled into the optoelectronic module 200 assembly with the release slide 202 positioned on the housing 208.

In some embodiments, the engagement pin 207 may be located on a first end section 214 (FIGS. 3E and 3F) of a latch 205. The latch 205 may also include a second end section 215 (FIGS. 3E and 3F) that interfaces with the cam 218. The cam 218 may interface with the release slide 202 such that the cam 218 rotates about a cam axis 220 as the release slide 202 is moved relative to the housing 208. For example, the cam 218 may rotate from a latched position to an unlatched position as the release slide 202 is moved from its latched position to its unlatched position.

The housing 208 may include seats 262 (FIG. 3F) configured to interface with the cam 218 such that the cam 218 may rotate about the cam axis 220 as the optoelectronic module 200 is moved between its latched configuration and its unlatched configuration. In some embodiments, the cam 218 may include substantially cylindrical-shaped sections 264 (FIGS. 3E and 3F) that may interface with corresponding, suitably-shaped seats 262. Alternately or additionally, other shapes and/or configurations of the cam 218 and/or the seats 262 may be used.

The cam 218 may include one or more first cam arms 266 (FIGS. 3A, 3B, 3E, and 3F). The first cam arms 266 may include protrusions 268 (FIGS. 3A, 3B, 3E, and 3F) radially offset from the cam axis 220. The protrusions 268 may be received in openings 270 (FIGS. 3E and 3F) located on the release slide arms 240 of the release slide 202. The protrusions 268 may include ramps 272 (FIGS. 3A, 3B, 3E, and 3F) to assist in assembly of the cam 218 and the release slide 202.

When the cam 218 rotates about the cam axis 220, the protrusions 268 travel along a circular curve having a radius equal to the radial offset of the protrusions 268 from the cam axis 220. Similarly, rotating the protrusions 268 about the cam axis 220 causes the cam 218 to rotate about the cam axis 220. Sliding motion of the release slide 202 may cause the cam 218 to rotate about the cam axis 220. In particular, as the release slide 202 is slid forward or backward relative to the housing 208 and the cam 218 seated in the seats 262, the openings 270 engage the protrusions 268 and cause them to move forward or backward with the release slide 202. Because the cam 218 is seated in the seats 262 of the housing, which may prevent translational movement of the cam 218 relative to the housing 208, the forward and backward motion of the protrusions 268 may be accommodated as rotation of the protrusions 268, and thus of the cam 218, about the cam axis 220. Although one embodiment of the optoelectronic module 200 may include protrusions 268 of the cam 218 interfaced with the openings 270 on the release slide 202, the cam 218 and the release slide 202 may be configured to interface in other ways that produce the same or similar motion of the cam 218 in response to the release slide 202 being moved from its latched position to its unlatched position.

The cam 218 may include a second cam arm 274 (FIGS. 3E and 3F). The second cam arm 274 may include a seat 276 (FIGS. 3E and 3F) configured to interface with a post 280 (FIGS. 3E and 3F) positioned on the second end section 215 of the latch 205. The seat 276 may generally be radially offset from the cam axis 220.

Optionally, the post 280 may include a tapered tip 282 (FIGS. 3E and 3F) on one side of the post 280 and the seat 276 may further be shaped to aid in assembling the latch 205 and the cam 218 to have a proper assembled configuration. Alternately or additionally, other asymmetrical features may be used in place of the tapered tip 282.

The cam 218 may include a slot 278 configured to at least partially receive a neck 284 of the latch 205 when the optoelectronic module 200 is in the latched configuration.

When the cam 218 rotates about the cam axis 220, the seat 276 travels along a circular curve having a radius equal to the radial offset of the seat from the cam axis 220. Rotation of the cam 218 may thus urge the post 280 along the same or similar circular curve as the seat 276. As the cam 218 is rotated from its latched position to its unlatched position, the cam 218 may urge the second end section 215 of the latch 205 outwards, e.g., away from a longitudinal midline of the optoelectronic module 200, or downwards. The second end section 215 may also be urged towards the rear of the housing 208, e.g., towards the end of the optoelectronic module 200 opposite the front end section 201.

The motion of the second end section 215 of the latch 205 may urge the latch 205 to rotate and slide relative to a crossbar 221 of the bottom housing 210, thus urging the first end section 214 of the latch 205 inwards, i.e., towards a longitudinal midline of the optoelectronic module 200 or upwards, and towards the rear of the housing 208. The bottom housing 210 may include a recess 222 sized and shaped to receive the latch 205 such that the engagement pin 207 disengages from the cage recess 104 and allows the optoelectronic module 200 to be removed from the cage 102.

In some embodiments, the release slide 202 may include an opening 224 sized and shaped to allow the second end section 215 of the latch 205 to move farther outwards or downwards than might otherwise be allowed if the release slide 202 did not include the opening 224. For instance, as perhaps best illustrated in FIG. 3D, the opening 224 allows the second end section 215 of the latch 205 to pass through a plane defined by the release slide base 238. By allowing the second end section 215 to move farther outwards, the first end section 214 may be allowed to move farther inwards. Combined with the forward motion of the latch 205, the engagement pin 207 may therefore move from its latched position or engaged position (best seen in FIG. 3C) to its unlatched position or disengaged position (best seen in FIG. 3D) within the space occupied by the optoelectronic module 200 and in response to a relatively small movement of the release slide 202.

The movement of the engagement pin 207 in a direction at least partially opposite to the direction of the release slide 202 may provide a smooth and/or enjoyable extraction feel for a user removing the optoelectronic module 200. For example, the force provided on the release slide 202 may not work against disengaging the engagement pin 207 from the cage opening 104.

As may be best understood with reference to FIG. 3C, the recess 222 and the cam 218 may be further sized and shaped to allow the optoelectronic module 200 to be inserted into the cage 102 while the optoelectronic module 200 is in the latched configuration. As the optoelectronic module 200 is inserted into the cage 102, the latch 205 may be urged to rotate inwards by the engagement pin 207 contacting a cage tab 106. In some embodiments, the inwards rotation of the latch 205 may be arrested by a stop 226. As used herein "insertion position" describes an inward-most position of the latch 205 achieved when the optoelectronic module 200 is inserted into the cage 102 while in the latched configuration. As the optoelectronic module 200 is further inserted into the cage 102, the engagement pin 207 may urge the cage tab 106 to protract or abduce relative to the cage 102, e.g., move away from a longitudinal midline of the cage 102 or downward, until the engagement pin 207 engages the cage recess 104.

The engagement pin 207 may include a ramped leading surface, as illustrated at least in FIGS. 3C and 3D. The engagement pin 207 may also include a relatively abrupt trailing edge opposite the ramped leading surface. As the optoelectronic module 200 is inserted into the cage 102, the ramped leading surface of the engagement pin 207 may come in contact with the cage tab 106. The ramped leading surface may allow the engagement pin 207 to relatively easily slide up the cage tab 106, causing the latch 205 to rotate such that the first end section 214 rotates upwards and/or to relatively easily urge the cage tab 106 downward as the optoelectronic module 200 is further inserted into the cage 102. At this point, the cage tab 106 may be resiliently bent downward. After the trailing edge of the engagement pin 207 clears a corresponding trailing edge of the cage tab 106 (alternately referred to as a leading edge of the cage recess 104), the cage tab 106 may spring upward, thereby causing the engagement pin 207 to "snap" into engagement with the cage 102.

The optoelectronic module 200 may thus provide tactile feedback and/or audio feedback to a user to indicate when the optoelectronic module 200 has been inserted far enough into the cage 102 that the engagement pin 207 is engaged with the cage recess 104. For example, a user may experience resistance as the engagement pin 207 is in contact with the cage tab 106 until the engagement pin 207 engages the cage recess 104, at which point the user may experience a sudden decrease in resistance as the engagement pin 207 and the cage tab 106 may cease to resistively contact one another. Alternately or additionally, audio feedback, e.g., in the form of a clicking sound, snapping sound, or the like may potentially be generated as the cage tab 106 resiliently and suddenly retracts or adduces relative to the cage 102, e.g., moves towards a longitudinal midline of the cage 102 (or upwards), and contacts the latch 205.

As may be best seen in FIGS. 3C-3F, in some embodiments, the latch 205 may include a protrusion 228 sized and shaped to be received by a saddle 230 located on the crossbar 221 of the bottom housing 210. Alternately or additionally, the latch 205 may include a fin 232 sized and shaped to be received by one or more trenches 234 formed in the recess 222 of the housing 208. The fin 232 may add strength to the latch 205.

The saddle 230 may allow the engagement pin 207 to be positioned relative to the housing 208 in assembly of the optoelectronic module 200. The protrusion 228 may fill the saddle 230 and may encourage proper assembly of the optoelectronic module 200. For example, the protrusion 228 and the saddle 230 may prevent upside down or inverted assembly of the latch 205 with the housing 208.

The latch 205 may further include shoulders 286 configured to contact shoulders 288 of the housing when the latch 205 is in its latched position, its unlatched position, and/or its insertion position. The contact between the shoulders 286 and the shoulders 288 and/or the housing 208 generally may encourage desired positioning of the latch 205 for engaging and/or disengaging the cage recess 104.

As best seen in FIG. 1A and FIG. 1B, the second end section 247 of the handle 204 may be positioned at least partially to a different side of the port opening 212 than the engagement pin 207. Thus, the second end section 247 may be located on a side of the port opening 212 and the fiber optic cable 206 (when present) different from the side of the optoelectronic module 200 including the engagement pin 207. For example, the engagement pin 207 may be located at the bottom of the optoelectronic module 200 and/or below the port opening 212 and the second end section 247 of the handle 204 may be located at the top of the optoelectronic module 200 and/or above the port opening 212.

3. Second Example Latching Mechanism

Figure 4A:
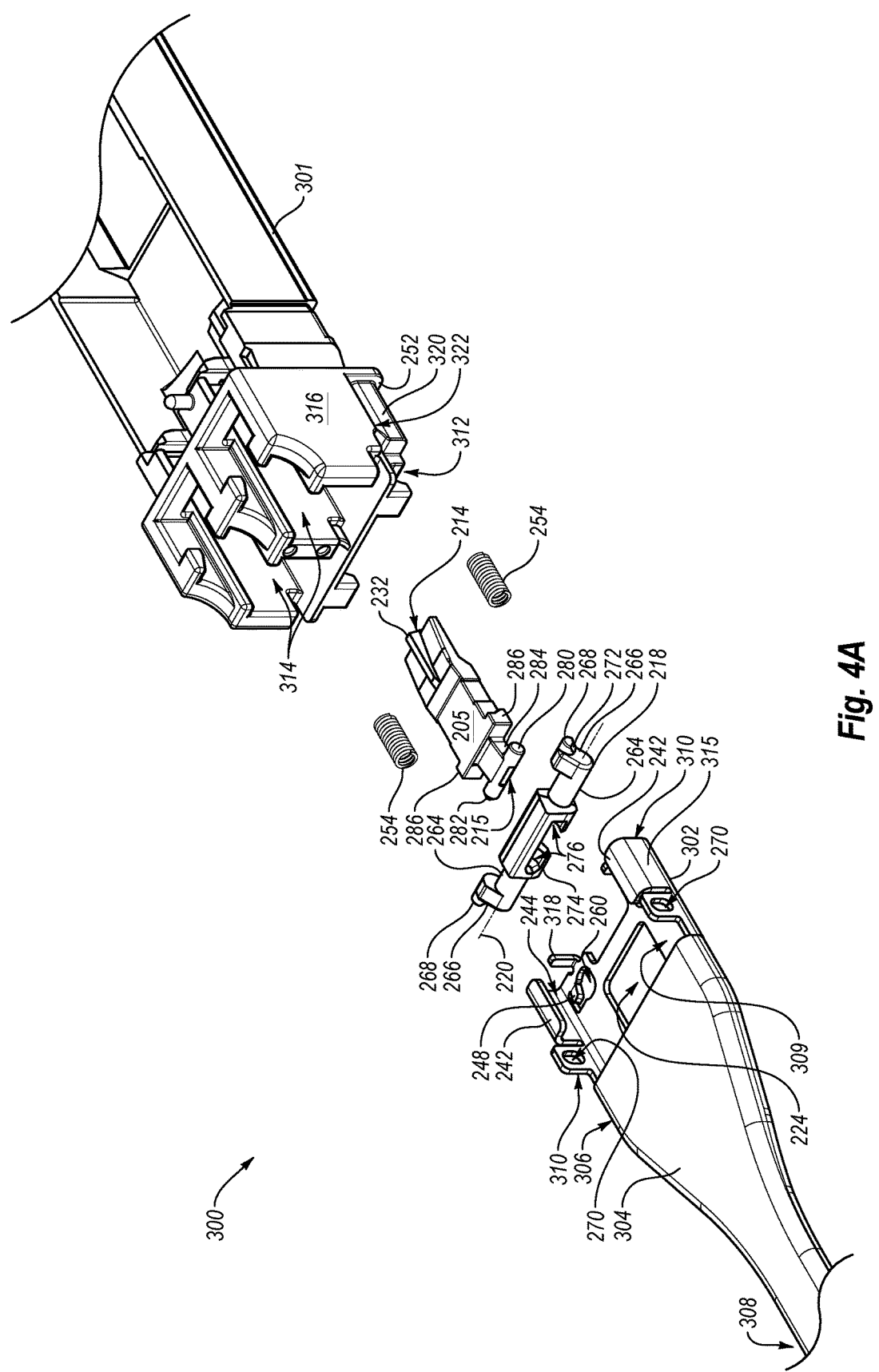
FIG. 4A is an exploded top perspective view of another example optoelectronic module.
Figure 4B:
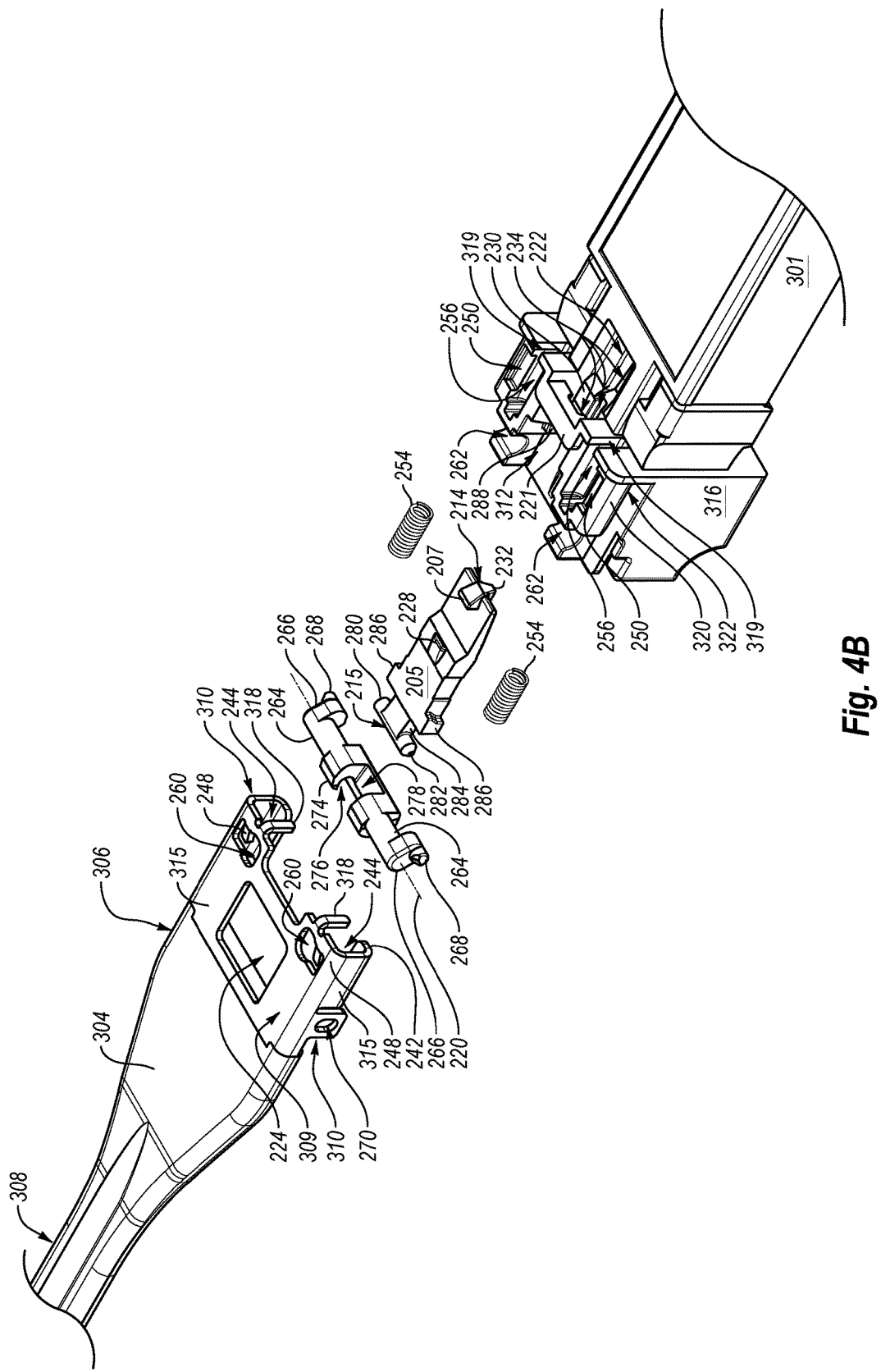
FIG. 4B is an exploded bottom perspective view of the optoelectronic module of FIG. 4A.

FIGS. 4A and 4B are, respectively, top and bottom exploded perspective views of a portion of a front end section of another example optoelectronic module 300.

The optoelectronic module 300 may engage and/or disengage from a host device cage (not shown) such as the cage 102 of FIGS. 1A-1B in a manner analogous to the optoelectronic module 200 of FIGS. 1A-3F. The optoelectronic module 300 may include some elements that are similar or identical to the elements of the optoelectronic module 200, such as the resilient members 254, the latch 205, the cam 218, and their associated elements, for which a more detailed description is already provided above.

The optoelectronic module 300 may include a bottom housing 301. The optoelectronic module 300 may further include a top housing (not shown) generally corresponding to the top housing 209 of the optoelectronic module 200 of FIGS. 1A-3F. The bottom housing 301 may include some elements that are similar or identical to the elements of the housing 208 of FIGS. 1A-3F such as the crossbar 221, the recess 222, the saddle 230, the trenches 234, the channels 250, the face 252, the recesses 256, the seats 262, and the shoulders 288, for which a more detailed description is already provided above.

The bottom housing 301 may include port openings 314 for reception of communication cables, such as communication cables analogous to the fiber optic cable 206 of FIGS. 1A and 1B. The bottom housing 301 may include a depression 312 analogous to the depression 216 of the housing 208 of FIGS. 1A-4B. The depression 312 may be sized and shaped to at least partially receive a release slide 302. In some embodiments, the depression 312 may be sized and shaped to receive the release slide 302 such that outer surfaces 315 of the release slide 302 are substantially aligned and/or flush with outer surfaces 316 of the bottom housing 301.

The bottom housing 301 may include ribs 320 and/or guides 322 that are analogous, respectively, to the ribs 236 and the guides 237 of the optoelectronic module 200.

The release slide 302 may be analogous to the release slide 202 of FIGS. 1A-3F. The release slide 302 may include some elements that are similar or identical to the elements of the release slide 202, such as the flanges 242, the tracks 244, the fingers 248, the openings 260, the openings 270, and the opening 224, for which a more detailed description is already provided above.

The release slide 302 may include fingers 318 analogous to the fingers 258 of the release slide 202. In some embodiments, the bottom housing 301 may include openings 319 to allow the fingers 318 to be bent into position while the release slide 302 is located on the bottom housing 301.

The optoelectronic module 300 may optionally include a handle 304. The handle 304 may include a first end section 306 coupled to the release slide 302. The handle 304 may further include a second end section 308. The second end section 308 may be positioned at least partially to a same side of the port openings 314 (and communication cable, when present) as the engagement pin 207 and/or the ribs 320.

The release slide 302 may include a release slide base 309 and release slide arms 310 analogous, respectively, to the release slide base 238 and the release slide arms 240 of the release slide 202. The configuration of the release slide base 309 and the release slide arms 310 may allow the handle 304 to be located substantially in line with the release slide 302. Similarly, the forces for removing the optoelectronic module 300 may be substantially inline and may minimize up and/or down movement, latitudinal movement, and/or rotational movement such as tipping, rocking, and/or rolling of the release slide 302 relative to the bottom housing 301 as the optoelectronic module 300 is disengaged from the cage.

4. Third Example Latching Mechanism

Figure 5A:
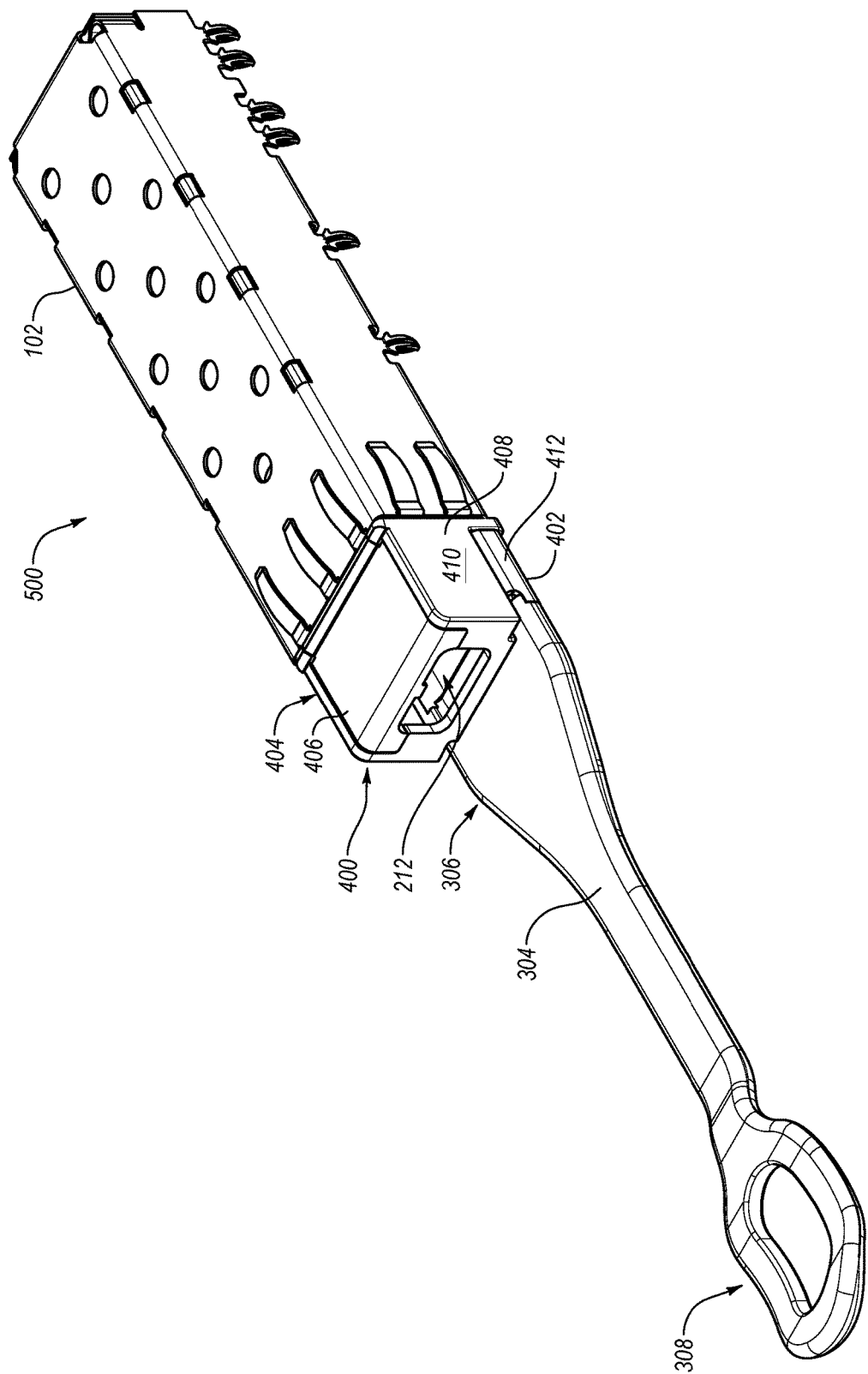
FIG. 5A is a top perspective view of portions of another example host device with another example optoelectronic module in a latched configuration located partially inside the example host device.
Figure 5B:
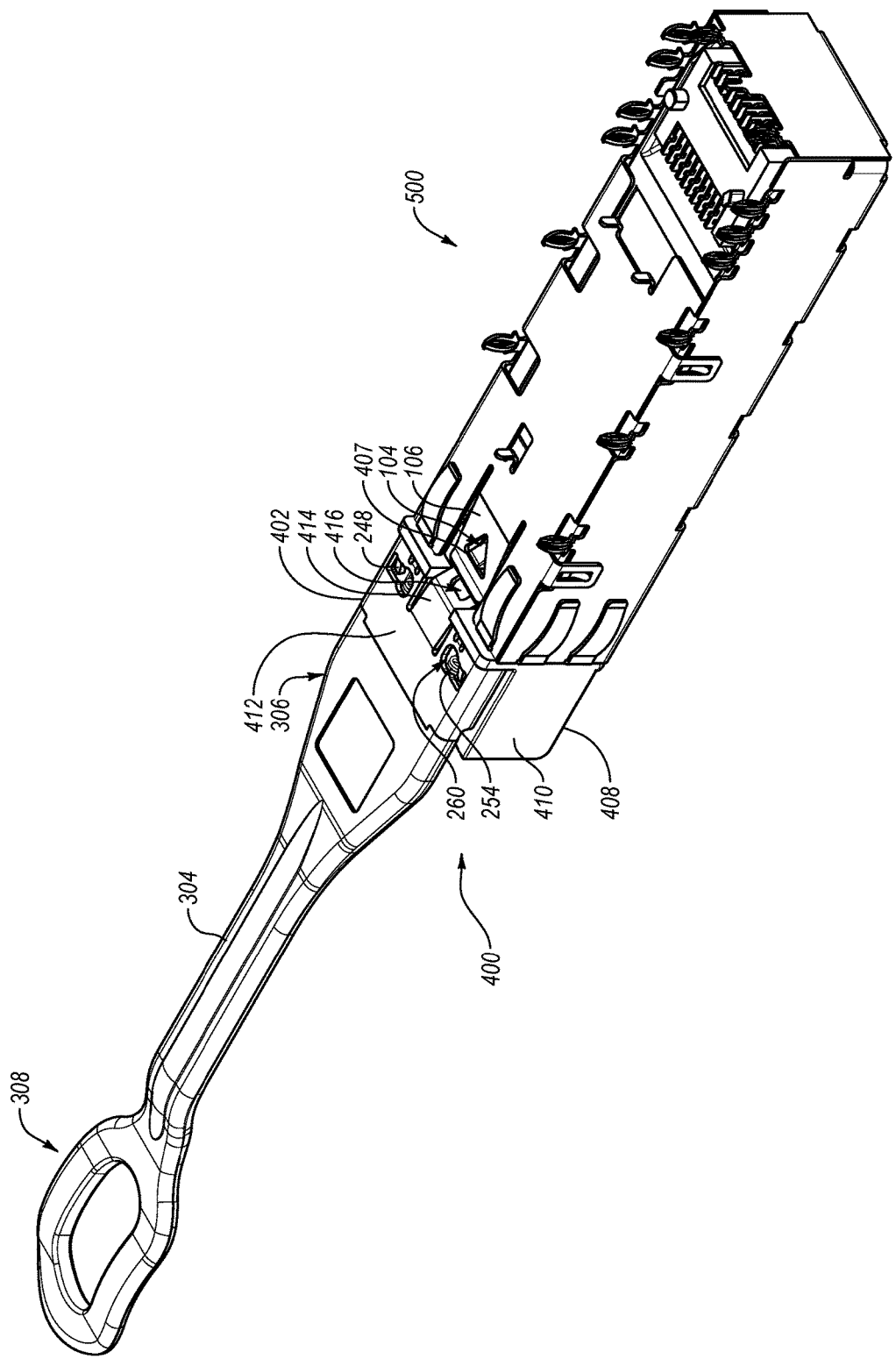
FIG. 5B is a bottom perspective view of the host device of FIG. 5A with the optoelectronic module in the latched configuration.

FIGS. 5A and 5B are, respectively, top and bottom perspective views of another example host device 500 with another example optoelectronic module 400 in a latched configuration located at least partially inside the host device 500.

The host device 500 includes some elements that are similar or identical to elements of the host device 100 of FIGS. 1A and 1B, such as the cage 102, the cage recess 104, and the cage tab 106.

The optoelectronic module 400 includes some elements that are similar or identical to elements of the optoelectronic module 300 of FIGS. 4A and 4B, such as the handle 304 and its associated elements, for which a more detailed description is already provided above.

Figure 6A:
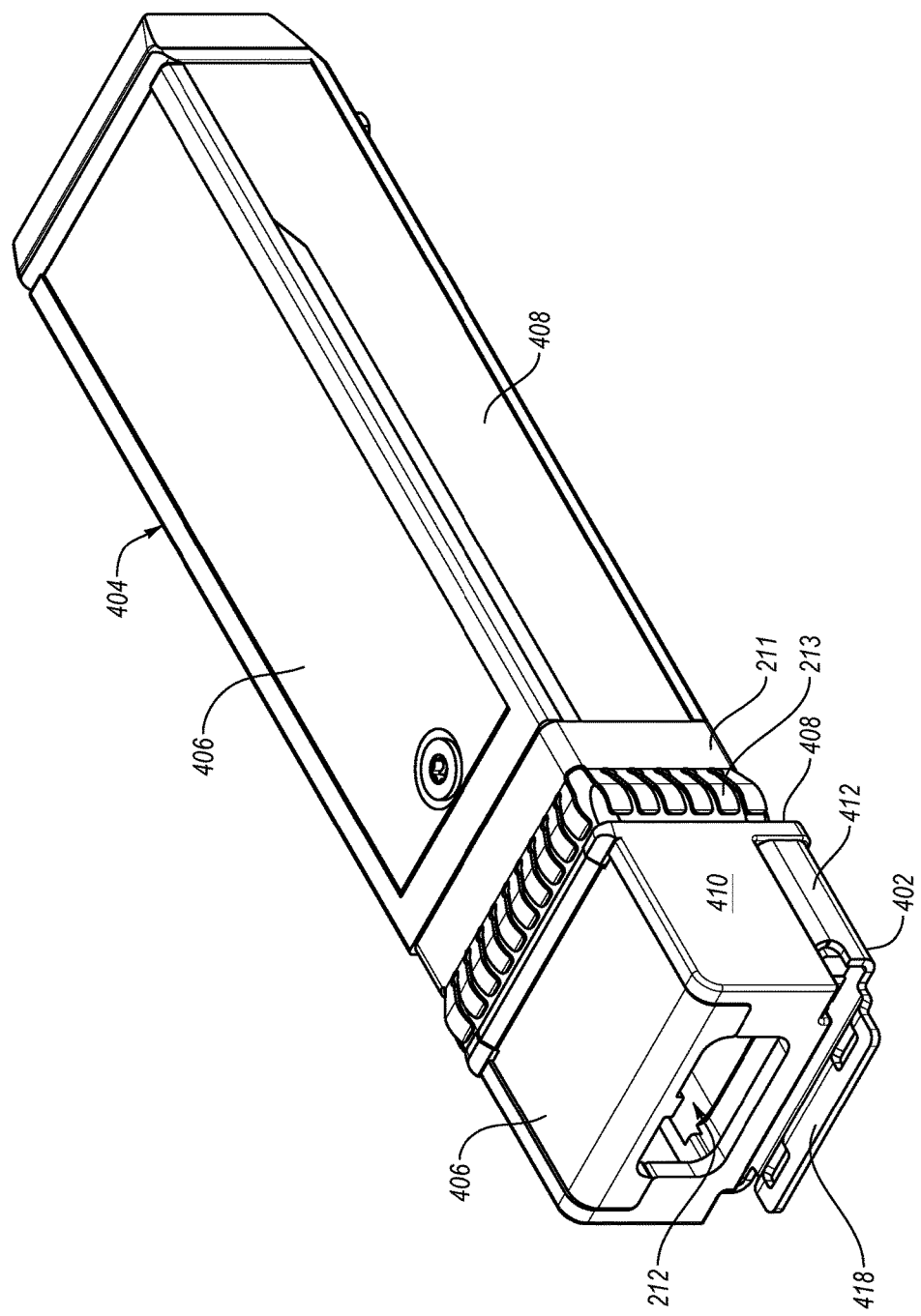
FIG. 6A is a top perspective view of portions of the optoelectronic module of FIG. 5A in the latched configuration with the host device omitted.
Figure 6B:
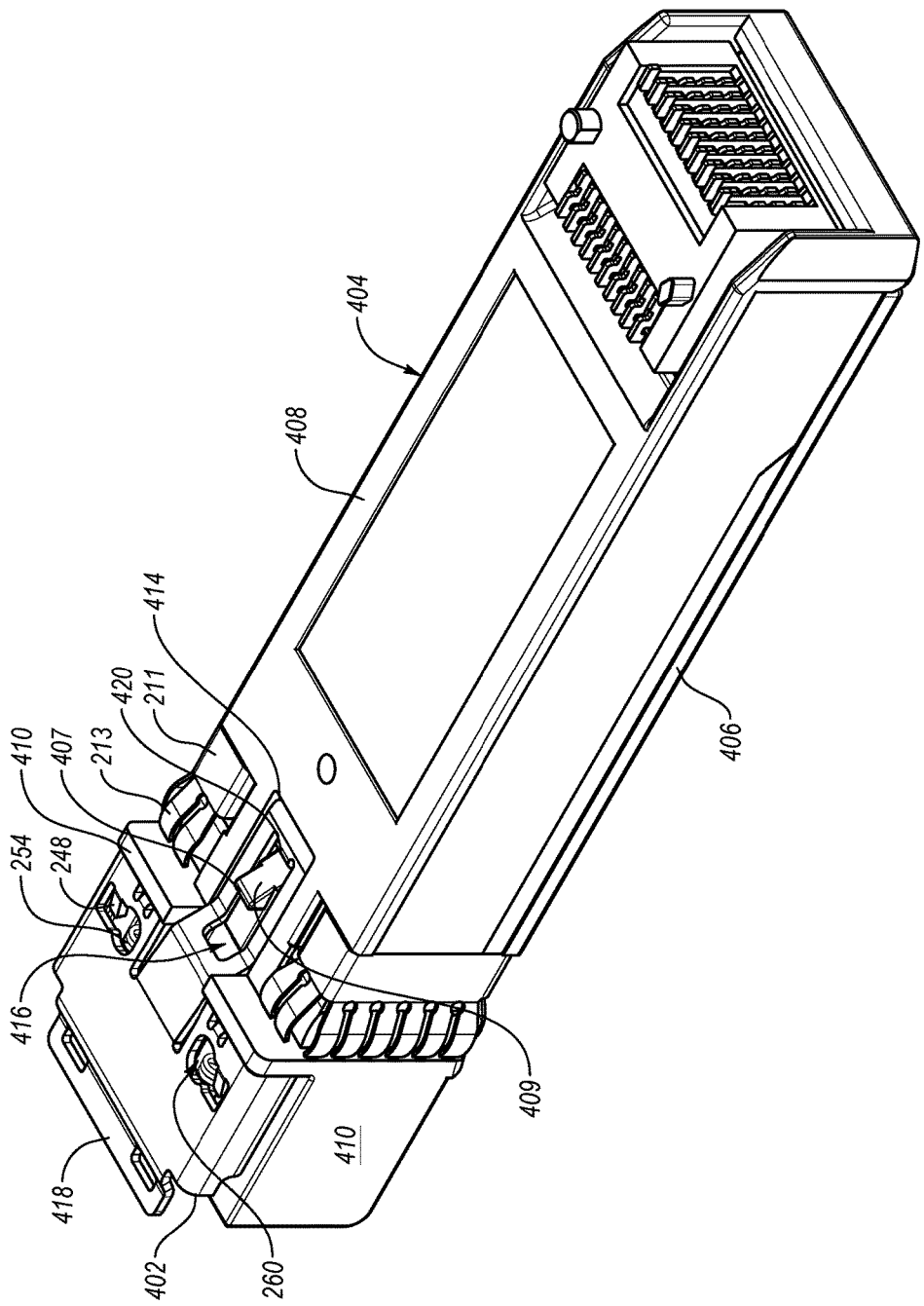
FIG. 6B is a bottom perspective view of the optoelectronic module of FIG. 6A in the latched configuration.

FIGS. 6A and 6B are, respectively, a top perspective view and a bottom perspective view of the optoelectronic module 400 with the handle 304 omitted.

With combined reference to FIGS. 5A-6B, the optoelectronic module 400 may be employed in the communication of optical signals and the conversion of optical signals to and from electrical signals in a manner similar to or the same as the optoelectronic module 200 of FIGS. 1A-4B.

The optoelectronic module 400 may include a housing 404 having a top housing 406 and a bottom housing 408 analogous, respectively, to the top housing 209 and the bottom housing 210 of the optoelectronic module 200 of FIGS. 1A-4B. The optoelectronic module 200 may include elements that are similar or identical to elements of the optoelectronic module 200 of FIGS. 1A-4B, such as the port opening 212, the EMI shield 211, and the conductive fingers 213, for which a more detailed description is already provided above.

The optoelectronic module 400 includes another example latching mechanism. The latching mechanism is configured for use in selectively securing and releasing the optoelectronic module 200 within a receptacle, such as the cage 102. For example, a release slide 402 may selectively protract the cage tab 106 relative to the cage 102 such that the cage recess 104 is disengaged from an engagement pin 407 of the housing 404.

Figure 7A:
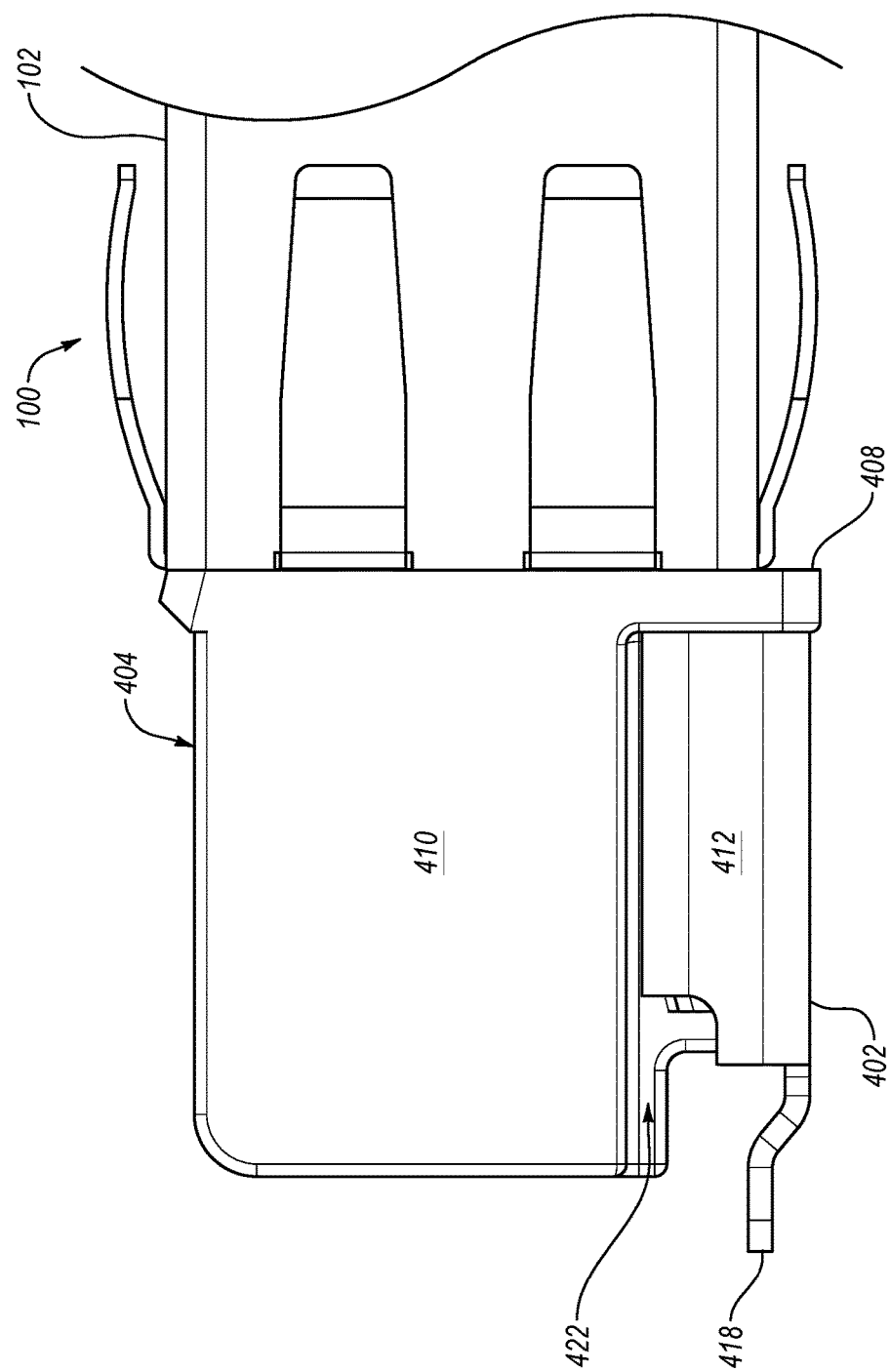
FIG. 7A is a side view of the example host device of FIG. 5A with the optoelectronic module in the latched configuration and with portions of the optoelectronic module omitted.
Figure 7B:
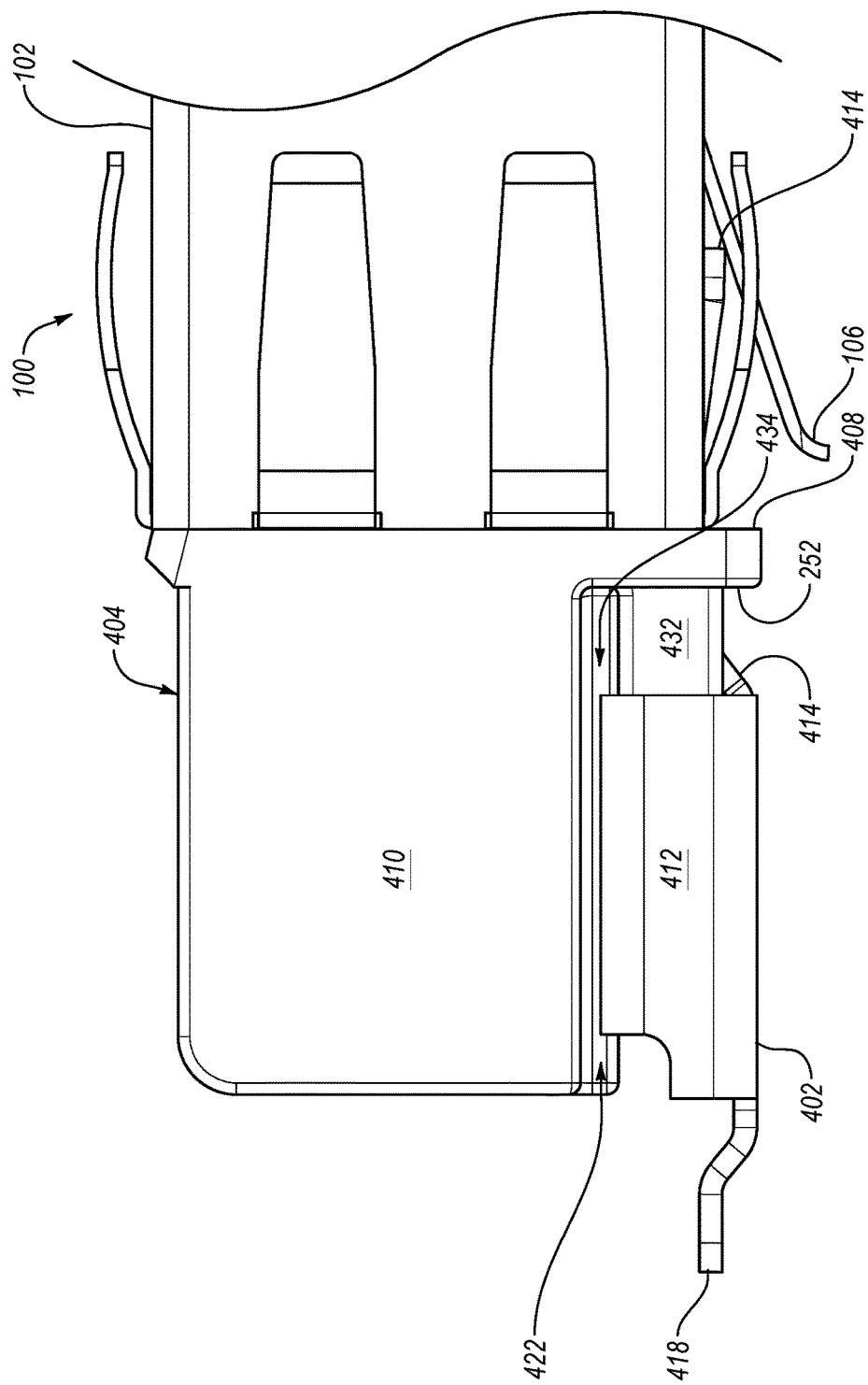
FIG. 7B is a side view of the host device of FIG. 7A with the optoelectronic module in an unlatched configuration.

FIGS. 7A and 7B are side views of the host device 500 with the optoelectronic module 400 in the latched configuration and the unlatched configuration, respectively.

Figure 7C:
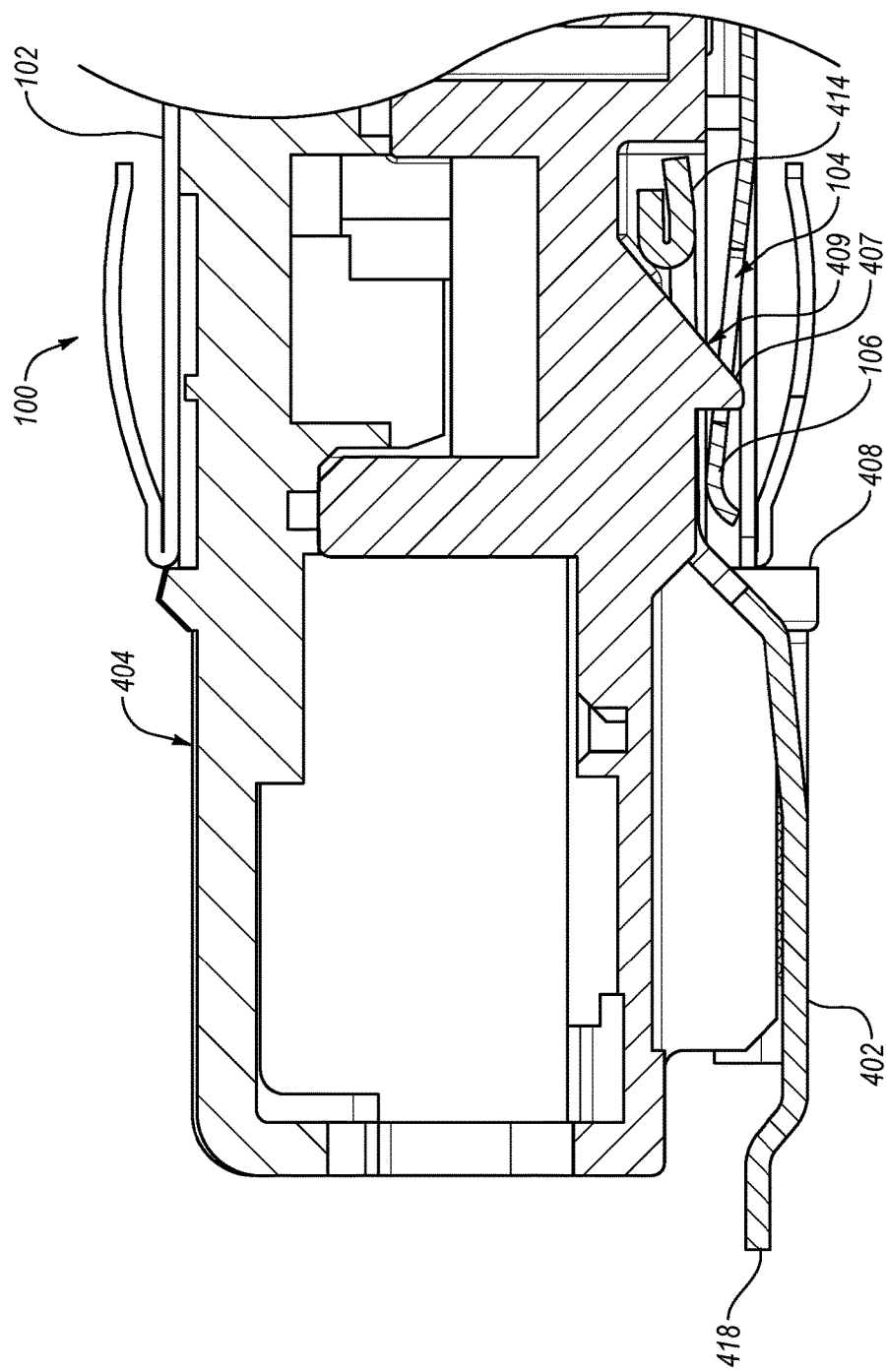
FIG. 7C is a cutaway side view of the portion of the host device of FIG. 7A with the optoelectronic module in the latched configuration.
Figure 7D:
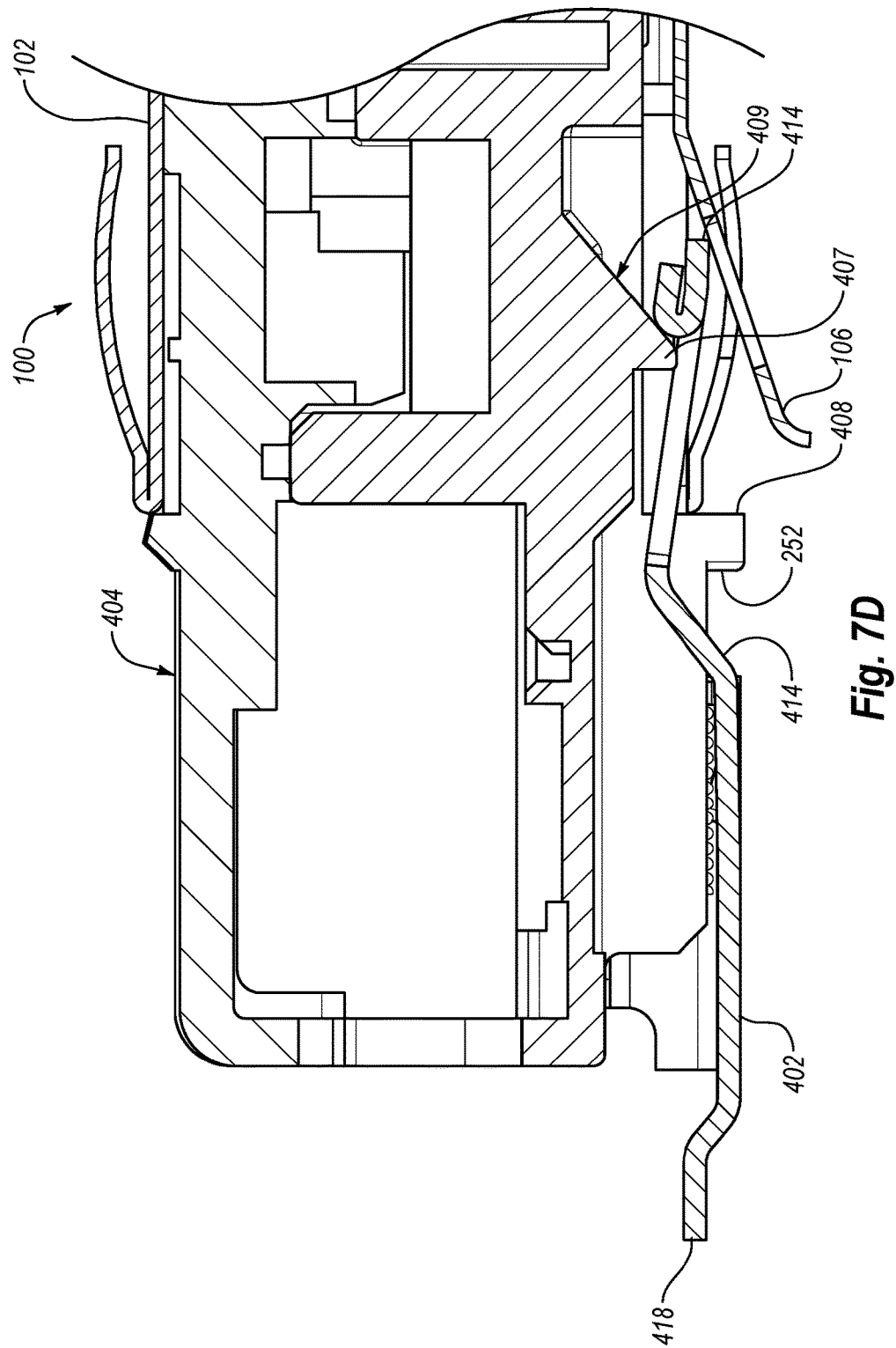
FIG. 7D is a cutaway side view of the portion of the host device of FIG. 7A with the optoelectronic module in the unlatched configuration.

FIGS. 7C and 7D are cutaway side views of the host device 500 with the optoelectronic module 400 in the latched configuration and the unlatched configuration, respectively.

Figure 7E:
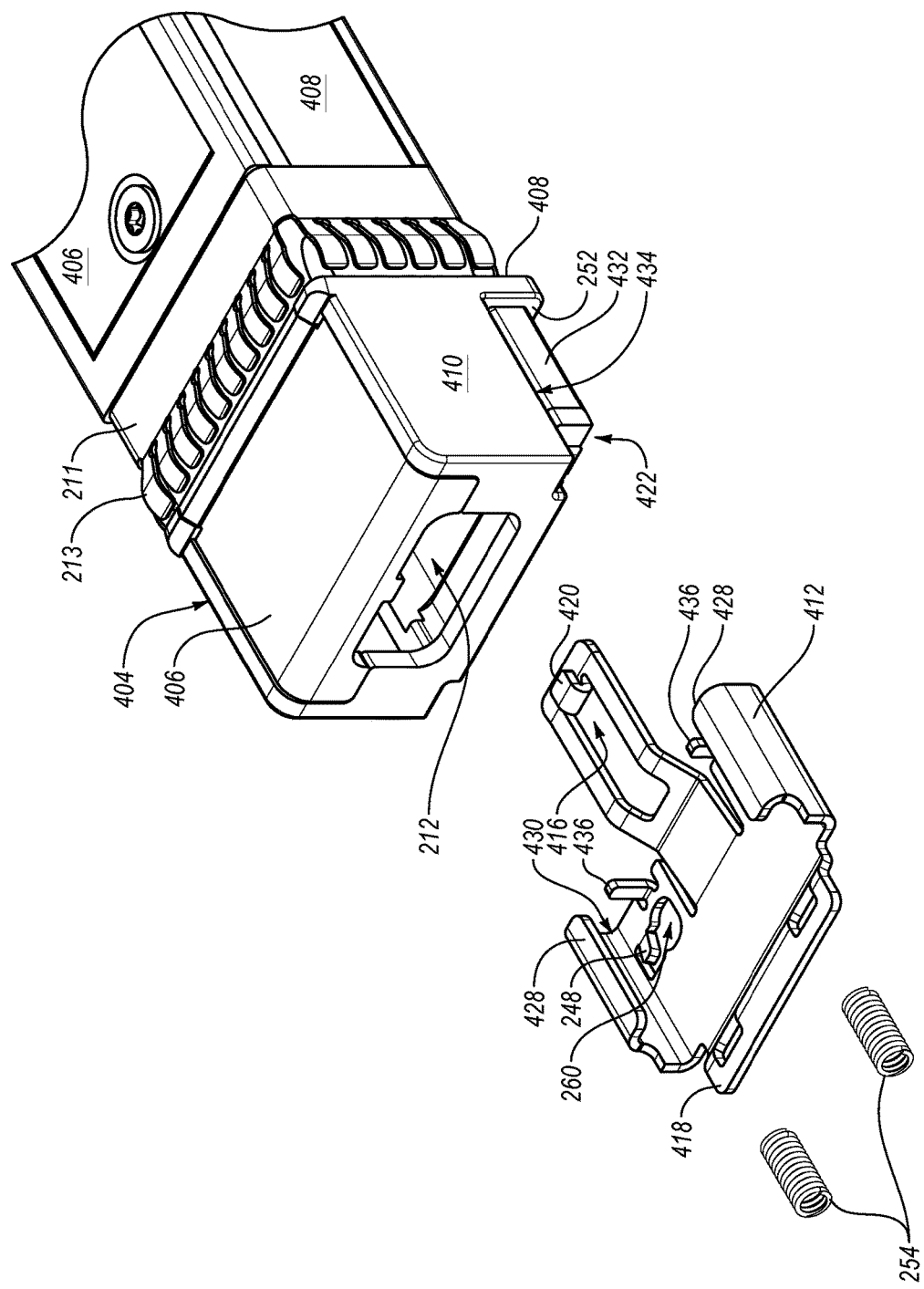
FIG. 7E is an exploded top perspective view of the portion of the optoelectronic module of FIG. 7A.
Figure 7F:
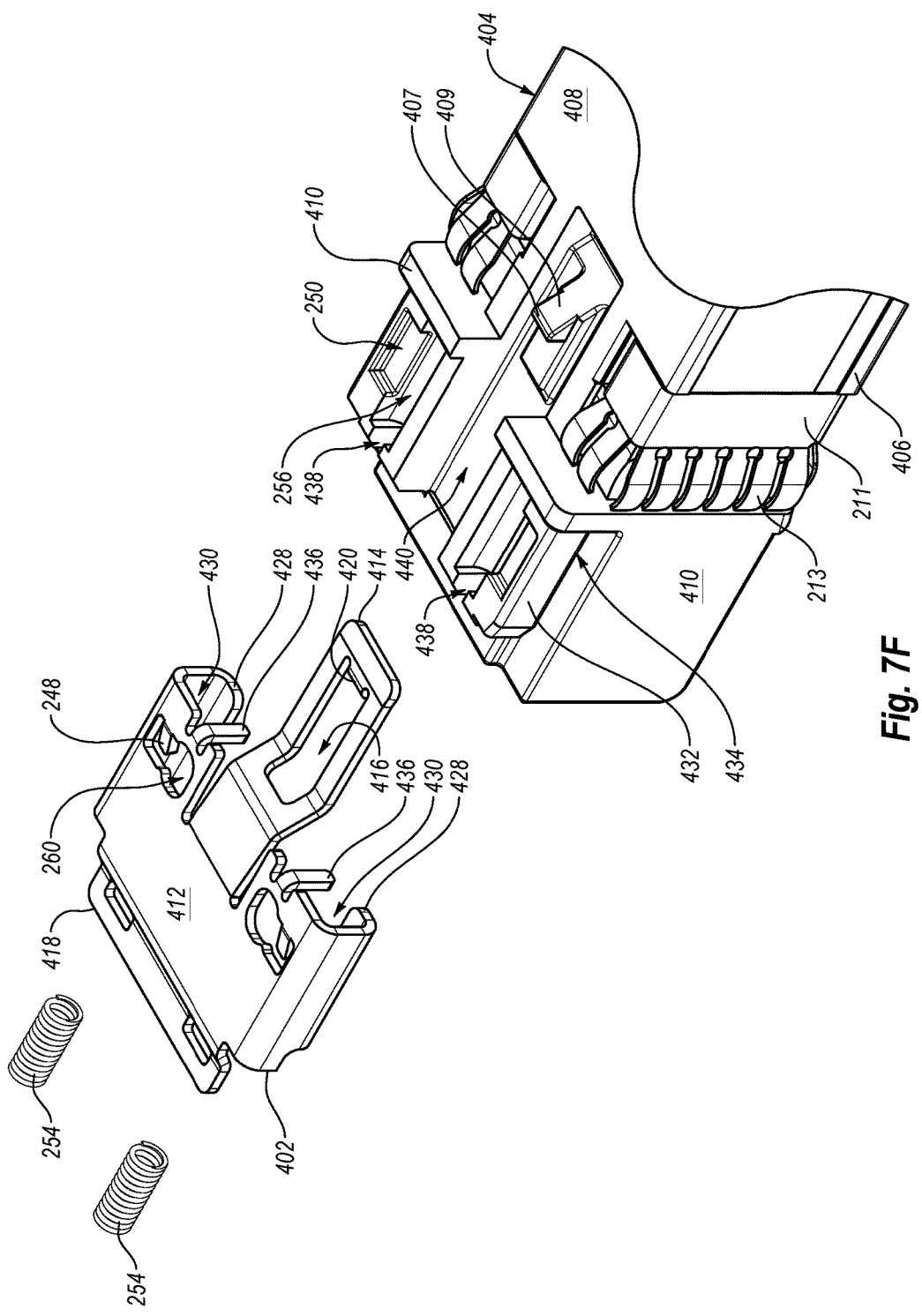
FIG. 7F is an exploded bottom perspective view of the portion of the optoelectronic module of FIG. 7A.

FIGS. 7E and 7F are, respectively, top and bottom exploded perspective views of the optoelectronic module 400.

With combined reference to FIGS. 7A-7E, the optoelectronic module 400 may include some elements that are similar or identical to the elements of the optoelectronic module 200 of FIGS. 1A-4B, such as the resilient members 254 (FIGS. 7E and 7F), for which a more detailed description is already provided above.

The housing 404 may include elements that are similar or identical to elements of the optoelectronic module 200, such as the channels 250 (FIG. 7F), the face 252 (FIGS. 7B and 7E), and the recesses 256 (FIG. 7F), for which a more detailed description is already provided above.

The housing 404 may include a depression 422 (FIGS. 7E and 7F) sized and shaped to at least partially receive the release slide 402. In some embodiments, the depression 422 may be sized and shaped to receive the release slide 402 such that outer surfaces 412 (FIGS. 7A, 7B, 7E, and 7F) of the release slide 402 are substantially aligned and/or flush with outer surfaces 410 (FIGS. 7A, 7B, 7E, and 7F) of the housing 404.

The housing 404 may further include ribs 432 (FIGS. 7A, 7E, and 7F) and/or guides 434 analogous (FIGS. 7A, 7E, and 7F), respectively, to the ribs 236 and the guides 237 of the optoelectronic module 200. The release slide 402 may further include fingers 436 (FIGS. 7E and 7F) analogous to the fingers 258 of the release slide 202. In some embodiments, the housing 404 may include openings 438 (FIGS. 7E and 7F) sized to allow the fingers 436 to enter the recesses 256 during assembly of the optoelectronic module 200. The openings 438 may further be sized such that the resilient members 254 are retained within the recesses 256 after being assembled into the optoelectronic module 200, e.g., after being inserted through the openings 260 as the release slide 402 is located on the housing 404. For example, the openings 438 may be narrower than a diameter of the resilient members 254.

The housing 404 includes the engagement pin 407 (FIGS. 7C-7E) configured to engage the cage recess 104 (FIGS. 7C and 7D) on the cage tab 106 (FIGS. 7B-7D) such that the optoelectronic module 400 is generally prevented from moving significantly within the cage 102 (FIGS. 7A-7D) until the cage tab 106 is intentionally disengaged from the engagement pin 407. As the optoelectronic module 400 is inserted into the cage 102, the engagement pin 407 contacts the cage tab 106 and urges it to protract.

The optoelectronic module 400 is configured to urge the cage tab 106 to protract from the cage 102 such that the cage recess 104 disengages the engagement pin 207 when the optoelectronic module 400 is in the unlatched configuration.

The release slide 402 may be formed and may slide relative to the housing 404 in a manner analogous to the release slide 202 of FIGS. 1A-4B. The release slide 402 may further include some elements that are similar or identical to elements of the release slide 202 of FIGS. 1A-4B, such as the fingers 248 (FIGS. 7E and 7F), and the openings 260 (FIGS. 7E and 7F), for which a more detailed description is already provided above.

The release slide 402 includes flanges 428 (FIGS. 7E and 7F) and tracks 430 (FIGS. 7E and 7F) analogous, respectively, to the flanges 242 and the tracks 244 of the release slide 202. The release slide may further include a coupling structure 418 for coupling the release slide 402 to the handle 304 (shown in FIGS. 5A and 5B) in a manner analogous to the coupling structure 203 of the release slide 202.

The release slide 402 includes a disengagement arm 414 (FIGS. 7C-7F) having an interfacing section 420 (FIGS. 7E and 7F) and an opening 416 (FIGS. 7E and 7F). The disengagement arm 414 may fit at least partially within a passage 440 (FIG. 7F) when the release slide 402 is in its latched position. When the release slide 402 is in its latched position, the engagement pin 407 extends through the opening 416 such that the cage recess 104 may engage the engagement pin 407.

As the release slide 402 is moved from its latched position to its unlatched position, the interfacing section 420 may interface with a surface 409 (FIGS. 7C-7F) of the engagement pin 407 such that the disengagement arm 414 resiliently protracts relative to the housing 404, e.g., bends resiliently away from a longitudinal midline of the housing 404 or downward. In some embodiments, the surface 409 may include a ramped surface. Alternately or additionally, the disengagement arm 414 may interface with surfaces of the housing 404 not on the engagement pin 407 that urge the disengagement arm 414 to protract relative to the housing as the release slide 402 is moved from its latched position to its unlatched position.

As the disengagement arm 414 protracts relative to the housing 404, the disengagement arm 414 may urge the cage tab 106 to resiliently protract relative to the cage 102, e.g., bends resiliently away from a longitudinal midline of the cage 102. The cage tab 106 may be urged to protract relative to the cage 102 such that the cage recess 104 is disengaged from the engagement pin 407 and allows the optoelectronic module 400 to be removed from the cage 102.

The latching mechanism of the optoelectronic module 400 may include relatively few parts, may have a low-profile, and/or may take up a relatively small amount of space. The latching mechanism may have a relatively low cost due at least in part to its simple design and its relatively few parts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A module comprising:
    a housing including a first rib located on a first side of the housing and a second rib located on a second side of the housing; and
    a release slide positioned at least partially on the housing, the release slide including:
        a first arm extending from the release slide, the first arm at least partially positioned on the first side of the housing, the first arm including a first flange positioned at least partially over the first rib; and
        a second arm extending from the release slide, the second arm at least partially positioned on the second side of the housing, the second arm including a second flange positioned at least partially over the second rib, wherein the second flange extends from the second arm towards the first flange.

2. The module of claim 1 further comprising a handle including a first end and a second end, wherein the release slide further includes a coupling structure coupled to the first end of the handle.

3. The module of claim 2, wherein:
    the housing further includes a port opening, and
    the first rib, the second rib, and the second end of the handle are positioned at least partially to a side of the port opening.

4. The module of claim 2, wherein:
    the housing further includes a port opening,
    the first rib and the second rib are positioned at least partially to a first side of the port opening, and
    the second end of the handle is positioned at least partially to a second side of the port opening that is different than the first side.

5. The module of claim 1, wherein:
    the housing further includes a port opening, and
    the first rib and the second rib are located entirely below the port opening.

6. The module of claim 5, wherein the release slide is located entirely below the port opening.

7. The module of claim 1, wherein:
    the housing further includes a depression relative to outer surfaces of the housing, and
    the release slide is at least partially positioned within the depression.

8. The module of claim 1, further comprising a resilient member configured to urge the release slide to a latched position relative to the housing.

9. The module of claim 1, wherein:
    the housing includes an engagement pin; and
    the release slide includes a disengagement arm,
    wherein:
        the engagement pin is configured to engage a recess of a cage when the release slide is in a latched position,
        the disengagement arm protracts relative to the housing in response to the release slide moving from the latched position to an unlatched position, and
        the disengagement arm is configured to urge a cage tab to protract relative to the cage such that the recess of the cage is disengaged from the engagement pin in response to the release slide moving from the latched position to the unlatched position.

10. The module of claim 1 further comprising:
a latch movably positioned on the housing, the latch including:
  a first end section having an engagement pin; and
  a second end section,
a cam rotatingly positioned on the housing, the cam including:
  a cam axis;
  a first cam arm extending from the cam axis, the first cam arm and the release slide forming a first interface; and
  a second cam arm extending from the cam axis, the second cam arm and the second end section of the latch forming a second interface,
wherein the release slide urges the cam to rotate about the cam axis via the first interface in response to the release slide moving between a latched position of the release slide and an unlatched position of the release slide, and the second cam arm urges the latch via the second interface to move the engagement pin between a latched position of the engagement pin and an unlatched position of the engagement pin in response to the cam rotating about the cam axis.

11. The module of claim 1, wherein the first flange extends from the first arm towards the second flange such that the first flange and the second flange are coplanar.

12. A module comprising:
a housing including a first rib located on a first side of the housing and a second rib located on a second side of the housing; and
a release slide positioned at least partially on the housing, the release slide including:
  a release slide base at least partially positioned beneath the first rib and the second rib;
  a first arm extending from the release slide base, the first arm at least partially positioned aside the first rib, the first arm including a first flange positioned at least partially above the first rib; and
  a second arm extending from the release slide base, the second arm at least partially positioned aside the second rib, the second arm including a second flange positioned at least partially above the second rib, wherein the second flange extends from the second arm towards the first flange.

13. The module of claim 12, wherein:
the housing further includes a port opening, and
the first rib and the second rib are located entirely below the port opening.

14. The module of claim 13, wherein the release slide is located entirely below the port opening.

15. The module of claim 12, wherein:
the housing includes an engagement pin; and
the release slide includes a disengagement arm, wherein:
  the engagement pin is configured to engage a recess of a cage when the release slide is in a latched position,
  the disengagement arm protracts relative to the housing in response to the release slide moving from the latched position to an unlatched position, and
  the disengagement arm is configured to urge a cage tab to protract relative to the cage such that the recess of the cage is disengaged from the engagement pin in response to the release slide moving from the latched position to the unlatched position.

16. The module of claim 12 further comprising:
a latch movably positioned on the housing, the latch including:
  a first end section having an engagement pin; and
  a second end section,
a cam rotatingly positioned on the housing, the cam including:
  a cam axis;
  a first cam arm extending from the cam axis, the first cam arm and the release slide forming a first interface; and
  a second cam arm extending from the cam axis, the second cam arm and the second end section of the latch forming a second interface,
wherein the release slide urges the cam to rotate about the cam axis via the first interface in response to the release slide moving between a latched position of the release slide and an unlatched position of the release slide, and the second cam arm urges the latch via the second interface to move the engagement pin between a latched position of the engagement pin and an unlatched position of the engagement pin in response to the cam rotating about the cam axis.

17. A module comprising:
a housing including a first rib located on a first side of the housing and a second rib located on a second side of the housing;
a release slide positioned at least partially on the housing, the release slide including:
  a release slide base;
  a first arm extending from the release slide base;
  a first flange extending from the first arm such that the first arm and the first flange define a first track, wherein the first rib is at least partially positioned within the first track;
  a second arm extending from the release slide base;
  a second flange extending from the second arm such that the second arm and the second flange define a second track, wherein the second rib is at least partially positioned within the second track;
a latch movably positioned on the housing, the latch including:
  a first end section having an engagement pin; and
  a second end section; and
a cam rotatingly positioned on the housing, the cam including:
  a cam axis;
  a first cam arm extending from the cam axis, the first cam arm and the release slide forming a first interface; and
  a second cam arm extending from the cam axis, the second cam arm and the second end section of the latch forming a second interface,
wherein the release slide urges the cam to rotate about the cam axis via the first interface in response to the release slide moving between a latched position of the release slide and an unlatched position of the release slide, and the second cam arm urges the latch via the second interface to move the engagement pin between a latched position of the engagement pin and an unlatched position of the engagement pin in response to the cam rotating about the cam axis.

18. The module of claim 17, wherein:
the housing further includes a port opening, and
the first rib and the second rib are located entirely below the port opening.

19. The module of claim 18, wherein the release slide is located entirely below the port opening.

20. The module of claim 17, wherein the second flange extends from the second arm towards the first flange.

* * * * *